(12) United States Patent
Stallings et al.

(10) Patent No.: US 10,222,934 B2
(45) Date of Patent: *Mar. 5, 2019

(54) CONDENSED PROGRAM GUIDE FOR MEDIA CONTENT ACCESS SYSTEMS AND METHODS

(75) Inventors: Heath Stallings, Colleyville, TX (US); Japan Mehta, Irving, TX (US); Don Relyea, Dallas, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1263 days.

This patent is subject to a terminal disclaimer.

(21) Appl. No.: 13/281,943

(22) Filed: Oct. 26, 2011

(65) Prior Publication Data

US 2012/0042341 A1  Feb. 16, 2012

Related U.S. Application Data

(63) Continuation of application No. 11/959,980, filed on Dec. 19, 2007, now Pat. No. 8,051,447.

(51) Int. Cl.
| | |
|---|---|
| *G06F 3/00* | (2006.01) |
| *G06F 3/0482* | (2013.01) |
| *H04N 5/445* | (2011.01) |
| *H04N 21/431* | (2011.01) |
| *H04N 21/45* | (2011.01) |
| *H04N 21/454* | (2011.01) |
| *H04N 21/482* | (2011.01) |

(52) U.S. Cl.
CPC ....... *G06F 3/0482* (2013.01); *H04N 5/44543* (2013.01); *H04N 21/4312* (2013.01); *H04N 21/4314* (2013.01); *H04N 21/454* (2013.01); *H04N 21/4532* (2013.01); *H04N 21/4826* (2013.01); *H04N 21/4828* (2013.01)

(58) Field of Classification Search
USPC .......................... 345/157; 715/227; 725/39
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,158,155 A | 10/1992 | Domain et al. |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,442,399 A | 8/1995 | Hooper et al. |
| 5,473,362 A | 12/1995 | Fitzgerald et al. |

(Continued)

Primary Examiner — Jefferey F Harold
Assistant Examiner — Sihar A Karwan

(57) ABSTRACT

An exemplary method includes a computing device providing a program guide that includes a matrix of cells associated with a plurality of media content instances and providing a condensed program guide that includes a condensed matrix of a subset of the cells and a plurality of interstitial symbols. In certain embodiments, each interstitial symbol in the plurality of interstitial symbols represents a single cell included in the matrix of the cells and excluded from the condensed matrix of the subset of the cells. In certain embodiments, the plurality of interstitial symbols does not occupy matrix grid space in the condensed matrix. Corresponding systems and methods are also disclosed.

16 Claims, 15 Drawing Sheets

(56) References Cited

U.S. PATENT DOCUMENTS

| | | |
|---|---|---|
| 5,479,266 A | 12/1995 | Young et al. |
| 5,479,268 A | 12/1995 | Young et al. |
| 5,499,103 A | 3/1996 | Mankovitz |
| 5,510,811 A | 4/1996 | Tobey et al. |
| 5,512,963 A | 4/1996 | Mankovitz |
| 5,515,173 A | 5/1996 | Mankovitz et al. |
| 5,517,257 A | 5/1996 | Dunn et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,585,838 A | 12/1996 | Lawler et al. |
| 5,600,368 A | 2/1997 | Matthews |
| 5,600,711 A | 2/1997 | Yuen |
| 5,616,876 A | 4/1997 | Cluts |
| 5,619,274 A | 4/1997 | Roop et al. |
| 5,623,613 A | 4/1997 | Rowe et al. |
| 5,630,119 A | 5/1997 | Aristides et al. |
| 5,640,484 A | 6/1997 | Mankovitz |
| 5,648,824 A | 7/1997 | Dunn et al. |
| 5,654,748 A | 8/1997 | Matthews |
| 5,657,072 A | 8/1997 | Aristides et al. |
| 5,673,401 A | 9/1997 | Volk et al. |
| 5,677,708 A | 10/1997 | Matthews et al. |
| 5,678,012 A | 10/1997 | Kimmich et al. |
| 5,682,511 A | 10/1997 | Sposato et al. |
| 5,684,525 A | 11/1997 | Klosterman |
| 5,687,331 A | 11/1997 | Volk et al. |
| 5,689,663 A | 11/1997 | Williams |
| 5,699,107 A | 12/1997 | Lawler et al. |
| 5,701,383 A | 12/1997 | Russo et al. |
| 5,706,145 A | 1/1998 | Hindman et al. |
| 5,721,829 A | 2/1998 | Dunn et al. |
| 5,724,492 A | 3/1998 | Matthews et al. |
| 5,727,060 A | 3/1998 | Young |
| 5,731,844 A | 3/1998 | Rauch et al. |
| 5,734,786 A | 3/1998 | Mankovitz |
| 5,734,823 A | 3/1998 | Saigh et al. |
| 5,734,891 A | 3/1998 | Saigh |
| 5,745,095 A | 4/1998 | Parchem et al. |
| 5,745,713 A | 4/1998 | Ferguson et al. |
| 5,751,282 A | 5/1998 | Girard et al. |
| 5,752,160 A | 5/1998 | Dunn |
| 5,757,417 A | 5/1998 | Aras et al. |
| 5,758,258 A | 5/1998 | Shoff et al. |
| 5,758,259 A | 5/1998 | Lawler |
| 5,774,172 A | 6/1998 | Kapell et al. |
| 5,781,228 A | 7/1998 | Sposato |
| 5,790,115 A | 8/1998 | Pleyer et al. |
| 5,790,198 A | 8/1998 | Roop et al. |
| 5,793,973 A | 8/1998 | Birdwell et al. |
| 5,801,787 A | 9/1998 | Schein et al. |
| 5,805,165 A | 9/1998 | Thorne et al. |
| 5,805,763 A | 9/1998 | Lawler et al. |
| 5,808,608 A | 9/1998 | Young et al. |
| 5,809,204 A | 9/1998 | Young et al. |
| 5,812,123 A | 9/1998 | Rowe et al. |
| 5,812,205 A | 9/1998 | Milnes et al. |
| 5,815,145 A | 9/1998 | Matthews |
| 5,815,195 A | 9/1998 | Tam |
| 5,828,945 A | 10/1998 | Klosterman |
| 5,857,190 A | 1/1999 | Brown |
| 5,861,906 A | 1/1999 | Dunn et al. |
| 5,870,150 A | 2/1999 | Yuen |
| 5,872,588 A | 2/1999 | Aras et al. |
| 5,874,985 A | 2/1999 | Matthews |
| 5,878,141 A | 3/1999 | Daly et al. |
| 5,883,627 A | 3/1999 | Pleyer |
| 5,886,746 A | 3/1999 | Yuen et al. |
| 5,900,905 A | 5/1999 | Shoff et al. |
| 5,905,522 A | 5/1999 | Lawler |
| 5,907,323 A | 5/1999 | Lawler et al. |
| 5,914,746 A | 6/1999 | Matthews et al. |
| 5,915,026 A | 6/1999 | Mankovitz |
| 5,923,362 A | 7/1999 | Klosterman |
| 5,940,073 A | 8/1999 | Klosterman et al. |
| 5,940,074 A | 8/1999 | Britt et al. |
| 5,945,987 A | 8/1999 | Dunn |
| 5,945,991 A | 8/1999 | Britt et al. |
| 5,949,954 A | 9/1999 | Young et al. |
| 5,959,688 A | 9/1999 | Schein et al. |
| 5,969,748 A | 10/1999 | Casement et al. |
| 5,970,206 A | 10/1999 | Yuen et al. |
| 5,974,222 A | 10/1999 | Yuen et al. |
| 5,987,213 A | 11/1999 | Mankovitz et al. |
| 5,987,509 A | 11/1999 | Portuesi |
| 5,988,078 A | 11/1999 | Levine |
| 5,990,883 A | 11/1999 | Byrne et al. |
| 5,991,498 A | 11/1999 | Young |
| 6,002,394 A | 12/1999 | Schein et al. |
| 6,002,852 A | 12/1999 | Birdwell et al. |
| 6,005,563 A | 12/1999 | White et al. |
| 6,008,803 A | 12/1999 | Rowe et al. |
| 6,008,836 A | 12/1999 | Bruck et al. |
| 6,014,706 A | 1/2000 | Cannon et al. |
| 6,016,141 A | 1/2000 | Knudson et al. |
| 6,025,837 A | 2/2000 | Matthews et al. |
| 6,028,599 A | 2/2000 | Yuen et al. |
| 6,028,604 A | 2/2000 | Matthews et al. |
| 6,034,689 A | 3/2000 | White et al. |
| 6,049,652 A | 4/2000 | Yuen et al. |
| 6,052,145 A | 4/2000 | Macrae et al. |
| 6,055,314 A | 4/2000 | Spies et al. |
| D424,061 S | 5/2000 | Backs et al. |
| D424,577 S | 5/2000 | Backs et al. |
| 6,072,485 A | 6/2000 | Barnes et al. |
| 6,072,983 A | 6/2000 | Klosterman |
| 6,075,551 A | 6/2000 | Berezowski et al. |
| 6,075,575 A | 6/2000 | Schein et al. |
| 6,078,348 A | 6/2000 | Klosterman et al. |
| 6,091,882 A | 7/2000 | Yuen et al. |
| 6,098,086 A | 8/2000 | Krueger et al. |
| 6,118,492 A | 9/2000 | Milnes et al. |
| D431,552 S | 10/2000 | Backs et al. |
| 6,133,909 A | 10/2000 | Schein et al. |
| 6,133,913 A | 10/2000 | White et al. |
| 6,137,950 A | 10/2000 | Yuen |
| 6,141,003 A | 10/2000 | Chor et al. |
| 6,141,678 A | 10/2000 | Britt |
| D433,403 S | 11/2000 | Backs et al. |
| D434,043 S | 11/2000 | Holland et al. |
| 6,144,378 A | 11/2000 | Lee |
| 6,144,401 A | 11/2000 | Casement et al. |
| 6,144,964 A | 11/2000 | Breese et al. |
| 6,151,059 A | 11/2000 | Schein et al. |
| 6,154,205 A | 11/2000 | Carroll et al. |
| D435,561 S | 12/2000 | Pettigrew et al. |
| 6,167,188 A | 12/2000 | Young et al. |
| 6,169,541 B1 | 1/2001 | Smith |
| 6,173,317 B1 | 1/2001 | Chaddha et al. |
| 6,177,931 B1 | 1/2001 | Alexander et al. |
| 6,177,945 B1 | 1/2001 | Pleyer |
| 6,182,072 B1 | 1/2001 | Leak et al. |
| 6,184,877 B1 | 2/2001 | Dodson et al. |
| 6,188,401 B1 | 2/2001 | Peyer |
| 6,215,483 B1 | 4/2001 | Zigmond |
| 6,215,526 B1 | 4/2001 | Barton et al. |
| 6,216,265 B1 | 4/2001 | Roop et al. |
| 6,230,319 B1 | 5/2001 | Britt et al. |
| 6,233,389 B1 | 5/2001 | Barton et al. |
| 6,237,022 B1 | 5/2001 | Bruck et al. |
| 6,239,794 B1 | 5/2001 | Yuen et al. |
| 6,240,555 B1 | 5/2001 | Shoff et al. |
| 6,247,176 B1 | 6/2001 | Schein et al. |
| D445,801 S | 7/2001 | Ma |
| 6,259,442 B1 | 7/2001 | Britt et al. |
| 6,262,722 B1 | 7/2001 | Allison et al. |
| 6,263,501 B1 | 7/2001 | Schein et al. |
| 6,266,059 B1 | 7/2001 | Matthews et al. |
| 6,268,856 B1 | 7/2001 | Bruck et al. |
| 6,292,834 B1 | 9/2001 | Ravi et al. |
| 6,304,969 B1 | 10/2001 | Wasserman et al. |

(56) References Cited

U.S. PATENT DOCUMENTS

| | | |
|---|---|---|
| 6,308,202 B1 | 10/2001 | Cohn et al. |
| 6,310,886 B1 | 10/2001 | Barton |
| 6,311,197 B2 | 10/2001 | Mighdoll et al. |
| 6,311,207 B1 | 10/2001 | Mighdoll et al. |
| D450,058 S | 11/2001 | Istvan et al. |
| D450,324 S | 11/2001 | Istvan et al. |
| D450,711 S | 11/2001 | Istvan et al. |
| 6,313,851 B1 | 11/2001 | Matthews et al. |
| 6,317,780 B1 | 11/2001 | Cohn et al. |
| 6,317,791 B1 | 11/2001 | Cohn et al. |
| 6,317,885 B1 | 11/2001 | Fries |
| 6,323,911 B1 | 11/2001 | Schein et al. |
| 6,327,418 B1 | 12/2001 | Barton |
| 6,330,719 B1 | 12/2001 | Zigmond et al. |
| 6,340,997 B1 | 1/2002 | Borseth |
| 6,341,195 B1 | 1/2002 | Mankovitz et al. |
| 6,341,374 B2 | 1/2002 | Schein et al. |
| D453,767 S | 2/2002 | Istvan et al. |
| D453,768 S | 2/2002 | Wilkins |
| D453,936 S | 2/2002 | Istvan et al. |
| 6,344,865 B1 | 2/2002 | Matthews et al. |
| 6,345,264 B1 | 2/2002 | Breese et al. |
| 6,347,398 B1 | 2/2002 | Parthasarathy et al. |
| 6,353,813 B1 | 3/2002 | Breese et al. |
| 6,378,035 B1 | 4/2002 | Parry et al. |
| 6,385,739 B1 | 5/2002 | Barton et al. |
| 6,388,714 B1 | 5/2002 | Schein et al. |
| 6,392,664 B1 | 5/2002 | White et al. |
| 6,396,473 B1 | 5/2002 | Callahan et al. |
| 6,396,546 B1 | 5/2002 | Alten et al. |
| 6,397,388 B1 | 5/2002 | Allen |
| 6,400,407 B1 | 6/2002 | Zigmond et al. |
| 6,412,110 B1 | 6/2002 | Schein et al. |
| 6,412,112 B1 | 6/2002 | Barrett et al. |
| 6,424,342 B1 | 7/2002 | Perlman et al. |
| 6,425,125 B1 | 7/2002 | Fries et al. |
| 6,430,358 B1 | 8/2002 | Yuen et al. |
| 6,430,359 B1 | 8/2002 | Yuen et al. |
| D462,333 S | 9/2002 | Novak |
| D462,339 S | 9/2002 | Allen et al. |
| D463,444 S | 9/2002 | Istvan et al. |
| 6,449,766 B1 | 9/2002 | Fleming |
| 6,453,471 B1 | 9/2002 | Klosterman |
| D463,788 S | 10/2002 | Smith et al. |
| 6,460,180 B1 | 10/2002 | Park et al. |
| 6,460,181 B1 | 10/2002 | Donnelly |
| 6,463,486 B1 | 10/2002 | Parry et al. |
| 6,466,734 B2 | 10/2002 | Yuen et al. |
| 6,469,721 B2 | 10/2002 | Matthews et al. |
| 6,469,753 B1 | 10/2002 | Klosterman et al. |
| 6,473,858 B1 | 10/2002 | Shimomura et al. |
| D465,227 S | 11/2002 | Ro et al. |
| 6,477,705 B1 | 11/2002 | Yuen et al. |
| 6,487,646 B1 | 11/2002 | Adams et al. |
| 6,489,986 B1 | 12/2002 | Allen |
| 6,490,722 B1 | 12/2002 | Barton et al. |
| 6,496,205 B1 | 12/2002 | White et al. |
| 6,498,754 B2 | 12/2002 | Peting et al. |
| 6,498,895 B2 | 12/2002 | Young et al. |
| 6,499,057 B1 | 12/2002 | Portuesi |
| D468,274 S | 1/2003 | Novak |
| D469,104 S | 1/2003 | Istvan et al. |
| D469,443 S | 1/2003 | Wilkins et al. |
| 6,505,232 B1 | 1/2003 | Mighdoll et al. |
| 6,505,348 B1 | 1/2003 | Knowles et al. |
| D470,152 S | 2/2003 | Witus |
| D470,153 S | 2/2003 | Billmaier et al. |
| 6,519,771 B1 | 2/2003 | Zenith |
| 6,526,471 B1 | 2/2003 | Shimomura et al. |
| 6,526,580 B2 | 2/2003 | Shimomura et al. |
| 6,529,233 B1 | 3/2003 | Allen |
| 6,535,253 B2 | 3/2003 | Barton et al. |
| 6,535,920 B1 | 3/2003 | Parry et al. |
| 6,538,701 B1 | 3/2003 | Yuen |
| 6,539,375 B2 | 3/2003 | Kawasaki |
| 6,549,719 B2 | 4/2003 | Mankovitz |
| D474,197 S | 5/2003 | Nguyen |
| 6,559,866 B2 | 5/2003 | Kolde et al. |
| 6,559,894 B2 | 5/2003 | Omura et al. |
| 6,560,678 B1 | 5/2003 | Weissman et al. |
| 6,560,777 B2 | 5/2003 | Blackketter et al. |
| 6,564,379 B1 | 5/2003 | Knudson et al. |
| 6,567,606 B2 | 5/2003 | Milnes et al. |
| 6,570,581 B1 | 5/2003 | Smith |
| 6,571,390 B1 | 5/2003 | Dunn et al. |
| 6,571,392 B1 | 5/2003 | Zigmond et al. |
| D475,718 S | 6/2003 | Witus et al. |
| 6,577,346 B1 | 6/2003 | Perlman |
| D476,994 S | 7/2003 | Simmons et al. |
| 6,588,013 B1 | 7/2003 | Lumley et al. |
| 6,591,421 B1 | 7/2003 | Sullivan |
| D478,090 S | 8/2003 | Nguyen et al. |
| D478,595 S | 8/2003 | Istvan et al. |
| D478,912 S | 8/2003 | Johnson |
| 6,606,652 B1 | 8/2003 | Cohn et al. |
| 6,628,301 B1 | 9/2003 | Acton et al. |
| 6,628,302 B2 | 9/2003 | White et al. |
| D480,733 S | 10/2003 | Hammerquist et al. |
| 6,630,963 B1 | 10/2003 | Billmaier |
| 6,631,523 B1 | 10/2003 | Matthews et al. |
| 6,633,877 B1 | 10/2003 | Saigh et al. |
| 6,637,031 B1 | 10/2003 | Chou |
| 6,637,032 B1 | 10/2003 | Feinleib |
| 6,642,939 B1 | 11/2003 | Vallone et al. |
| 6,643,798 B2 | 11/2003 | Barton et al. |
| 6,651,251 B1 | 11/2003 | Shoff et al. |
| RE38,376 E | 12/2003 | Matthews, III |
| 6,662,218 B2 | 12/2003 | Mighdoll et al. |
| 6,668,133 B2 | 12/2003 | Yuen et al. |
| 6,668,377 B1 | 12/2003 | Dunn |
| 6,678,737 B1 | 1/2004 | Bucher |
| 6,681,396 B1 | 1/2004 | Bates et al. |
| 6,683,630 B1 | 1/2004 | Shoff et al. |
| 6,684,025 B1 | 1/2004 | Perlman |
| D486,834 S | 2/2004 | Allen et al. |
| 6,687,906 B1 | 2/2004 | Yuen et al. |
| 6,694,352 B1 | 2/2004 | Omoigui |
| 6,698,020 B1 | 2/2004 | Zigmond et al. |
| 6,704,058 B2 | 3/2004 | Ranta |
| 6,704,773 B1 | 3/2004 | Cohn et al. |
| 6,704,776 B1 | 3/2004 | Fortune |
| 6,704,813 B2 | 3/2004 | Smirnov et al. |
| 6,704,929 B1 | 3/2004 | Ozer et al. |
| 6,708,335 B1 | 3/2004 | Ozer et al. |
| 6,710,815 B1 | 3/2004 | Billmaier et al. |
| 6,721,953 B1 | 4/2004 | Bates et al. |
| 6,724,405 B2 | 4/2004 | Matthews et al. |
| 6,727,935 B1 | 4/2004 | Allen et al. |
| 6,728,713 B1 | 4/2004 | Beach et al. |
| D490,086 S | 5/2004 | Wilkins et al. |
| 6,732,325 B1 | 5/2004 | Tash et al. |
| 6,732,369 B1 | 5/2004 | Schein et al. |
| 6,742,043 B1 | 5/2004 | Moussa et al. |
| 6,742,183 B1 | 5/2004 | Reynolds et al. |
| 6,745,391 B1 | 6/2004 | Macrae et al. |
| 6,748,375 B1 | 6/2004 | Wong et al. |
| 6,748,481 B1 | 6/2004 | Parry et al. |
| 6,754,715 B1 | 6/2004 | Cannon et al. |
| 6,756,997 B1 | 6/2004 | Ward et al. |
| 6,757,837 B1 | 6/2004 | Platt et al. |
| 6,757,906 B1 | 6/2004 | Look et al. |
| 6,760,537 B2 | 7/2004 | Mankovitz |
| 6,762,773 B2 | 7/2004 | Kolde et al. |
| 6,766,523 B2 | 7/2004 | Herley |
| 6,766,524 B1 | 7/2004 | Matheny et al. |
| D494,186 S | 8/2004 | Johnson |
| 6,772,438 B1 | 8/2004 | Blackketter et al. |
| 6,785,901 B1 | 8/2004 | Horiwitz et al. |
| 6,785,902 B1 | 8/2004 | Zigmond et al. |
| D496,665 S | 9/2004 | Billmaier et al. |
| 6,792,195 B2 | 9/2004 | Barton |
| 6,798,457 B2 | 9/2004 | Boyden et al. |
| 6,798,971 B2 | 9/2004 | Potrebic |
| 6,799,326 B2 | 9/2004 | Boylan et al. |

(56) References Cited

U.S. PATENT DOCUMENTS

| | | |
|---|---|---|
| 6,799,327 B1 | 9/2004 | Reynolds et al. |
| 6,804,824 B1 | 10/2004 | Potrebic et al. |
| 6,804,825 B1 | 10/2004 | White et al. |
| 6,813,643 B2 | 11/2004 | Perlman |
| 6,819,344 B2 | 11/2004 | Robbins |
| 6,820,144 B2 | 11/2004 | Smirnov et al. |
| 6,829,779 B1 | 12/2004 | Perlman |
| 6,842,837 B1 | 1/2005 | Peting et al. |
| 6,847,778 B1 | 1/2005 | Vallone et al. |
| 6,847,779 B2 | 1/2005 | Pietraszak |
| 6,850,691 B1 | 2/2005 | Stam et al. |
| 6,850,693 B2 | 2/2005 | Young et al. |
| 6,859,799 B1 | 2/2005 | Yuen |
| 6,859,937 B1 | 2/2005 | Narayan et al. |
| 6,861,952 B1 | 3/2005 | Billmaier |
| 6,865,555 B2 | 3/2005 | Novak |
| 6,868,225 B1 | 3/2005 | Brown et al. |
| 6,868,551 B1 | 3/2005 | Lawler et al. |
| 6,886,179 B1 | 4/2005 | Perlman |
| 6,891,553 B2 | 5/2005 | White et al. |
| 6,892,390 B1 | 5/2005 | Lieberman et al. |
| 6,897,904 B2 | 5/2005 | Potrebic et al. |
| 6,898,765 B2 | 5/2005 | Matthews et al. |
| 6,901,453 B1 | 5/2005 | Pritchett et al. |
| 6,903,753 B1 | 6/2005 | Gray et al. |
| 6,904,609 B1 | 6/2005 | Pietraszak et al. |
| 6,906,755 B2 | 6/2005 | Lundblad et al. |
| 6,907,576 B2 | 6/2005 | Barbanson et al. |
| 6,915,528 B1 | 7/2005 | McKenna |
| 6,928,652 B1 | 8/2005 | Goldman |
| 6,928,655 B1 | 8/2005 | Omoigui |
| 6,931,657 B1 | 8/2005 | Marsh |
| 6,938,077 B2 | 8/2005 | Sanders |
| 6,938,270 B2 | 8/2005 | Blackketter et al. |
| 6,941,575 B2 | 9/2005 | Allen |
| 6,943,843 B2 | 9/2005 | Boyden et al. |
| 6,944,880 B1 | 9/2005 | Allen |
| 6,947,935 B1 | 9/2005 | Horvitz et al. |
| 6,957,260 B1 | 10/2005 | Mighdoll et al. |
| 6,963,903 B2 | 11/2005 | Krueger et al. |
| 6,963,906 B2 | 11/2005 | Portuesi |
| 6,965,415 B2 | 11/2005 | Lundblad et al. |
| 6,965,730 B2 | 11/2005 | Chamberlin et al. |
| 6,966,066 B1 | 11/2005 | Zigmond et al. |
| 6,968,364 B1 | 11/2005 | Wong et al. |
| 6,970,640 B2 | 11/2005 | Green et al. |
| 6,972,787 B1 | 12/2005 | Allen et al. |
| 6,973,050 B2 | 12/2005 | Birdwell et al. |
| 6,973,664 B2 | 12/2005 | Fries |
| 6,973,669 B2 | 12/2005 | Daniels |
| 6,975,713 B1 | 12/2005 | Smith et al. |
| 6,975,717 B1 | 12/2005 | Smith et al. |
| 6,980,638 B1 | 12/2005 | Smith |
| 6,980,993 B2 | 12/2005 | Horvitz et al. |
| 6,981,227 B1 | 12/2005 | Taylor |
| 6,986,062 B2 | 1/2006 | Carpenter |
| 6,990,462 B1 | 1/2006 | Wilcox et al. |
| 6,990,497 B2 | 1/2006 | O'Rourke et al. |
| 6,990,671 B1 | 1/2006 | Evans et al. |
| 6,990,677 B1 | 1/2006 | Pietraszak et al. |
| 6,990,678 B2 | 1/2006 | Zigmond |
| 6,993,532 B1 | 1/2006 | Platt et al. |
| 6,996,390 B2 | 2/2006 | Herley et al. |
| 7,003,795 B2 | 2/2006 | Allen |
| 7,006,613 B2 | 2/2006 | Novak et al. |
| 7,007,244 B2 | 2/2006 | Pankovcin |
| D516,573 S | 3/2006 | Gibson |
| D517,059 S | 3/2006 | Newby et al. |
| D517,087 S | 3/2006 | Sands |
| 7,010,265 B2 | 3/2006 | Coffin |
| 7,013,238 B1 | 3/2006 | Weare |
| 7,015,925 B2 | 3/2006 | Ford et al. |
| 7,017,174 B1 | 3/2006 | Sheedy |
| D518,487 S | 4/2006 | MacKenzie et al. |
| D519,122 S | 4/2006 | MacKenzie et al. |
| D519,519 S | 4/2006 | Vong |
| D519,521 S | 4/2006 | Fong |
| 7,023,492 B2 | 4/2006 | Sullivan |
| 7,024,424 B1 | 4/2006 | Platt et al. |
| 7,026,964 B2 | 4/2006 | Baldwin et al. |
| 7,027,101 B1 | 4/2006 | Sloo et al. |
| 7,028,325 B1 | 4/2006 | Rui et al. |
| 7,030,886 B2 | 4/2006 | Ford et al. |
| 7,032,177 B2 | 4/2006 | Novak et al. |
| 7,034,776 B1 | 4/2006 | Love |
| 7,034,927 B1 | 4/2006 | Allen et al. |
| 7,035,355 B2 | 4/2006 | Lais et al. |
| 7,035,526 B2 | 4/2006 | Green |
| 7,036,083 B1 | 4/2006 | Zenith |
| 7,036,090 B1 | 4/2006 | Nguyen |
| 7,036,091 B1 | 4/2006 | Nguyen |
| 7,036,092 B2 | 4/2006 | Sloo et al. |
| 7,036,138 B1 | 4/2006 | Tash |
| 7,038,690 B2 | 5/2006 | Wilt et al. |
| 7,039,935 B2 | 5/2006 | Knudson et al. |
| 7,042,526 B1 | 5/2006 | Borseth |
| 7,043,477 B2 | 5/2006 | Mercer et al. |
| 7,046,805 B2 | 5/2006 | Fitzhardinge et al. |
| 7,050,097 B2 | 5/2006 | Schick et al. |
| 7,050,867 B2 | 5/2006 | Maymudes |
| 7,051,111 B1 | 5/2006 | Scullin |
| 7,051,282 B2 | 5/2006 | Marcjan |
| 7,051,351 B2 | 5/2006 | Goldman et al. |
| 7,055,031 B2 | 5/2006 | Platt |
| 7,055,104 B1 | 5/2006 | Billmaier et al. |
| 7,058,720 B1 | 6/2006 | Majidimehr |
| 7,058,816 B2 | 6/2006 | Valeria |
| 7,058,936 B2 | 6/2006 | Chilimbi et al. |
| 7,065,553 B1 | 6/2006 | Chesley et al. |
| 7,069,284 B2 | 6/2006 | Peting |
| 7,069,576 B1 | 6/2006 | Knudson et al. |
| 7,071,968 B2 | 7/2006 | Novak |
| 7,073,118 B2 | 7/2006 | Greenberg et al. |
| 7,073,193 B2 | 7/2006 | Marsh |
| 7,076,202 B1 | 7/2006 | Billmaier |
| 7,076,734 B2 | 7/2006 | Wolff et al. |
| 7,076,792 B2 | 7/2006 | Zigmond et al. |
| 7,076,794 B2 | 7/2006 | Lieberman et al. |
| 7,080,394 B2 | 7/2006 | Istvan et al. |
| 7,088,910 B2 | 8/2006 | Potrebic et al. |
| 7,093,273 B2 | 8/2006 | Marsh |
| 7,098,868 B2 | 8/2006 | Love et al. |
| 7,099,952 B2 | 8/2006 | Wong et al. |
| 7,103,904 B1 | 9/2006 | Blackketter et al. |
| 7,103,905 B2 | 9/2006 | Novak |
| 7,103,908 B2 | 9/2006 | Tomsen |
| 7,107,532 B1 | 9/2006 | Billmaier et al. |
| 7,107,608 B2 | 9/2006 | Wagner et al. |
| 7,111,320 B1 | 9/2006 | Novak |
| 7,116,894 B1 | 10/2006 | Chatterton |
| 7,117,439 B2 | 10/2006 | Barrett et al. |
| 7,127,127 B2 | 10/2006 | Jojic et al. |
| 7,130,846 B2 | 10/2006 | Danker et al. |
| 7,131,054 B2 | 10/2006 | Greenberg et al. |
| 7,142,230 B2 | 11/2006 | Novak et al. |
| 7,146,632 B2 | 12/2006 | Miller |
| 7,155,675 B2 | 12/2006 | Billmaier et al. |
| 7,155,734 B1 | 12/2006 | Shimomura et al. |
| 7,158,531 B2 | 1/2007 | Barton |
| 7,159,176 B2 | 1/2007 | Billmaier et al. |
| 7,159,177 B2 | 1/2007 | Billmaier et al. |
| 7,161,877 B2 | 1/2007 | Lai et al. |
| 7,161,994 B2 | 1/2007 | Shah et al. |
| 7,162,728 B1 | 1/2007 | Bahn |
| 7,165,264 B1 | 1/2007 | Westrick |
| 7,167,531 B2 | 1/2007 | Greenberg et al. |
| 7,194,511 B2 | 3/2007 | Stettner |
| 7,194,754 B2 | 3/2007 | Tomsen |
| 7,197,234 B1 | 3/2007 | Chatterton |
| 7,197,715 B1 | 3/2007 | Valeria |
| 7,200,321 B2 | 4/2007 | Otala et al. |
| 7,200,859 B1 | 4/2007 | Perlman et al. |
| 7,203,952 B2 | 4/2007 | Broadus |
| 7,216,235 B1 | 5/2007 | Platt |

(56) References Cited

U.S. PATENT DOCUMENTS

| | | |
|---|---|---|
| 7,228,556 B2 | 6/2007 | Beach et al. |
| 7,236,204 B2 | 6/2007 | Perlman |
| 7,237,252 B2 | 6/2007 | Billmaier |
| 7,243,123 B1 | 7/2007 | Allen et al. |
| 7,245,817 B1 | 7/2007 | Nichols et al. |
| 7,251,255 B1 | 7/2007 | Young |
| 7,251,294 B2 | 7/2007 | Peting |
| 7,263,362 B1 | 8/2007 | Young et al. |
| D551,668 S | 9/2007 | Newby et al. |
| 7,266,832 B2 | 9/2007 | Miller |
| 7,266,835 B2 | 9/2007 | Halbert |
| 7,272,298 B1 | 9/2007 | Lang et al. |
| 7,272,657 B2 | 9/2007 | Allen et al. |
| D552,610 S | 10/2007 | Newby et al. |
| 7,296,284 B1 | 11/2007 | Price et al. |
| 7,302,696 B1 | 11/2007 | Yamamoto |
| 7,310,355 B1 | 12/2007 | Krein et al. |
| 7,313,802 B1 | 12/2007 | Tomsen |
| 7,320,134 B1 | 1/2008 | Tomsen et al. |
| 7,320,137 B1 | 1/2008 | Novak et al. |
| 7,321,716 B1 | 1/2008 | Vallone et al. |
| 7,340,761 B2 | 3/2008 | Billmaier |
| 7,350,157 B1 | 3/2008 | Billmaier et al. |
| 7,360,232 B2 | 4/2008 | Mitchell |
| 7,380,260 B1 | 5/2008 | Billmaier et al. |
| 7,382,838 B2 | 6/2008 | Peting |
| 7,386,129 B2 | 6/2008 | Perlman |
| 7,391,808 B1 | 6/2008 | Farrand |
| 7,409,546 B2 | 8/2008 | Platt |
| 7,428,023 B2 | 9/2008 | Allen et al. |
| 7,434,246 B2 | 10/2008 | Florence |
| 7,440,523 B2 | 10/2008 | Lais et al. |
| 7,463,737 B2 | 12/2008 | Gillon |
| 7,466,640 B2 | 12/2008 | Snow et al. |
| 7,484,234 B1 | 1/2009 | Heaton |
| 7,487,459 B2 | 2/2009 | Billmaier et al. |
| 7,487,529 B1 | 2/2009 | Orlick |
| 7,493,015 B1 | 2/2009 | Van Stam et al. |
| 7,518,629 B2 | 4/2009 | Novak et al. |
| 7,529,465 B2 | 5/2009 | Barton et al. |
| 7,533,403 B1 | 5/2009 | Krein et al. |
| 7,543,325 B2 | 6/2009 | Westbrook et al. |
| 7,546,622 B2 | 6/2009 | Tash |
| 7,558,472 B2 | 7/2009 | Locket et al. |
| 7,573,529 B2 | 8/2009 | Perlman |
| 7,574,656 B2 | 8/2009 | Billmaier et al. |
| 7,590,240 B2 | 9/2009 | Platt et al. |
| 7,594,246 B1 | 9/2009 | Billmaier et al. |
| 7,650,569 B1 | 1/2010 | Allen et al. |
| 7,661,121 B2 | 2/2010 | Smith et al. |
| 7,665,111 B1 | 2/2010 | Barton |
| 7,668,435 B2 | 2/2010 | Lockett et al. |
| 7,671,758 B1 | 3/2010 | Seidel et al. |
| 2001/0029610 A1 | 10/2001 | Corvin et al. |
| 2001/0047298 A1 | 11/2001 | Moore et al. |
| 2001/0049820 A1 | 12/2001 | Barton |
| 2001/0054181 A1 | 12/2001 | Corvin |
| 2002/0073424 A1 | 6/2002 | Ward et al. |
| 2002/0124255 A1 | 9/2002 | Reichardt et al. |
| 2003/0005445 A1 | 1/2003 | Schein et al. |
| 2003/0056219 A1 | 3/2003 | Reichardt et al. |
| 2003/0110495 A1 | 6/2003 | Bennington et al. |
| 2003/0110499 A1 | 6/2003 | Knudson et al. |
| 2003/0115599 A1 | 6/2003 | Bennington et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0204847 A1 | 10/2003 | Ellis et al. |
| 2003/0208756 A1 | 11/2003 | Macrae et al. |
| 2003/0221192 A1 | 11/2003 | Rappaport et al. |
| 2004/0010806 A1 | 1/2004 | Yuen et al. |
| 2004/0045025 A1 | 3/2004 | Ward et al. |
| 2004/0107437 A1 | 6/2004 | Reichardt et al. |
| 2004/0168189 A1 | 8/2004 | Reynolds et al. |
| 2004/0194138 A1 | 9/2004 | Boylan et al. |
| 2004/0261098 A1 | 12/2004 | Macrae et al. |
| 2005/0010949 A1 | 1/2005 | Ward et al. |
| 2005/0028201 A1 | 2/2005 | Klosterman et al. |
| 2005/0120369 A1 * | 6/2005 | Matz ................ H04N 7/163 725/40 |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0216936 A1 | 9/2005 | Knudson et al. |
| 2005/0251824 A1 | 11/2005 | Thomas et al. |
| 2006/0156336 A1 | 7/2006 | Knudson et al. |
| 2006/0174189 A1 | 8/2006 | Weitzman et al. |
| 2006/0212894 A1 | 9/2006 | Knudson et al. |
| 2006/0250358 A1 * | 11/2006 | Wroblewski ........ G06F 3/0346 345/157 |
| 2006/0277574 A1 | 12/2006 | Schein et al. |
| 2006/0288366 A1 | 12/2006 | Boylan et al. |
| 2007/0016926 A1 | 1/2007 | Ward et al. |
| 2007/0033613 A1 | 2/2007 | Ward et al. |
| 2007/0107010 A1 | 5/2007 | Jolna et al. |
| 2008/0270885 A1 * | 10/2008 | Petersen et al. ............ 715/227 |
| 2008/0270886 A1 * | 10/2008 | Gossweiler ........ G06F 3/0483 715/227 |
| 2009/0125843 A1 | 5/2009 | Billmaier et al. |
| 2010/0138868 A1 | 6/2010 | Sie et al. |

\* cited by examiner

CONDENSED PROGRAM GUIDE FOR MEDIA CONTENT ACCESS SYSTEMS AND METHODS

RELATED APPLICATIONS

This application is a continuation application of U.S. patent application Ser. No. 11/959,980, filed on Dec. 19, 2007, and entitled CONDENSED PROGRAM GUIDE FOR MEDIA CONTENT ACCESS SYSTEMS AND METHODS, which is hereby incorporated by reference in its entirety.

BACKGROUND INFORMATION

The set-top box ("STB") has become an important computing device for accessing media content services and the media content within those services. An STB is usually configured to provide users with access to a large number and variety of media content choices offered by a provider. For example, a user may choose to experience a variety of broadcast television programs, pay-per-view services, video-on-demand programming, Internet services, and audio programming via an STB.

The large number of media content choices offered by providers can make it difficult for a user of an STB to find and select desired media content. On-screen program guides have alleviated this problem to some degree. A user of an STB is able to navigate a conventional program guide in search of a desired media channel or program.

As providers have expanded and continue to expand the services and media content choices provided to users (e.g., more media channels), conventional tools for navigating within program guides have become inefficient and less effective. For example, it is a time-consuming task to scroll through a conventional program guide having hundreds of channels in search of a particular media channel or program. Moreover, conventional tools for searching or filtering program guide data typically require users to leave a standard program guide view in order to provide searching or filtering criteria and/or to view the results of a search or filter operation. This can be a jarring change for a user, and may discourage the use of search and/or filter tools.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

Exemplary apparatuses, systems, and methods for providing one or more condensed program guides are disclosed herein. In certain embodiments, a media content processing subsystem (e.g., a set-top box) may be configured to provide a program guide including a matrix of cells associated with a plurality of media content instances. The media content processing subsystem may be further configured to provide a condensed program guide including a condensed matrix of a subset of the cells and at least one interstitial symbol representing at least one of the cells excluded from the subset, and consequently from the condensed matrix. In certain embodiments, the media content processing subsystem may be configured to provide a graphical user interface to a display for presentation to a user. The graphical user interface may include at least a portion of the condensed program guide, i.e., a condensed program guide view.

The condensed program guide may be a condensed version of a first program guide, e.g., a full program guide including a matrix of cells for all available media content instances. Accordingly, a similar user experience may be provided for views of the first program guide and the condensed program guide. As an example, the media content processing subsystem may be configured to receive user input and provide a condensed program guide in response to the user input. For instance, the media content processing subsystem may receive one or more program guide search or filter parameters, or media content recommendation data (e.g., a list of media content instances recommended by one or more users), and filter the matrix of cells in the first program guide based on the user input to identify a subset of the cells. Cells not included in the subset may be removed from the matrix, and the matrix may be spatially condensed to fill in the gaps and form a condensed program guide including a condensed matrix of the subset of cells.

One or more interstitial symbols may be included in the condensed program guide to represent cells excluded from the condensed matrix. The interstitial symbols may indicate matrix positions of the excluded cells. In certain embodiments, the interstitial symbols may include selectable objects configured to provide users with convenient and intuitive access to information about the excluded cells and corresponding media content instances.

In certain embodiments, the interstitial symbols are spatially insubstantial in the condensed matrix. That is, the interstitial symbols may be positioned between, or at least proximate to, boundary edges of cells included in the condensed matrix, without occupying matrix grid space. This may facilitate both condensing of a filtered matrix and nonintrusive representation of cells excluded from the filtered matrix.

Components and functions of exemplary media content access apparatuses, systems, and methods, including providing of condensed program guides, will now be described in more detail.

Figure 1:
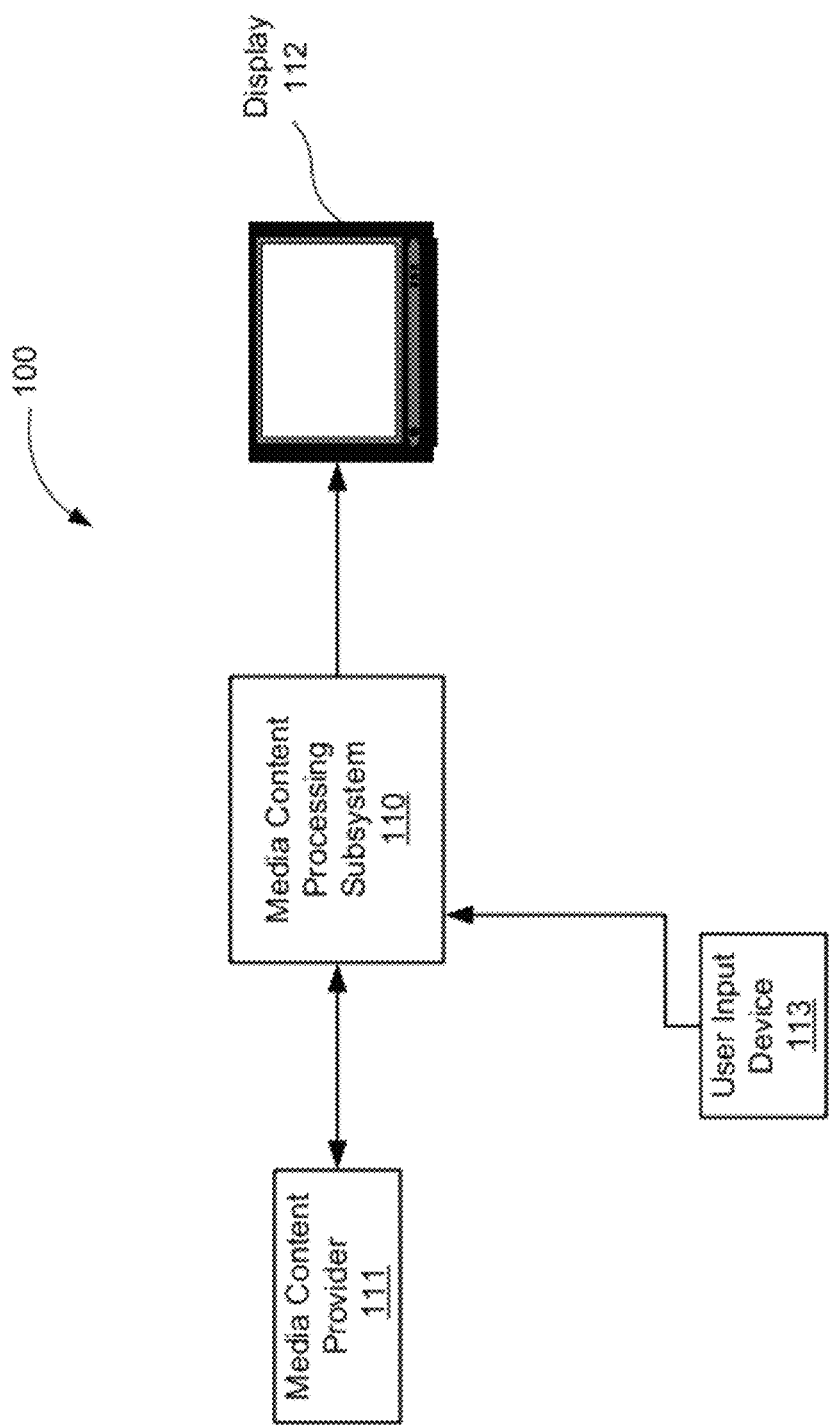
FIG. 1 illustrates an example of a media content access system.

FIG. 1 illustrates an exemplary media content access system 100 (or simply "system 100"). As shown in FIG. 1, system 100 may include a media content processing subsystem 110, which may be configured to communicate with and receive a signal or data stream containing data representative of media content and/or program guide data from a media content provider 111. Media content processing subsystem 110 and media content provider 111 may communicate using any known communication technologies, devices, networks, media, and protocols supportive of remote data communications, including, but not limited to, cable networks, subscriber television networks, satellite networks, the Internet, intranets, local area networks, wireless networks (e.g., Wi-Fi and/or mobile telephone networks), optical fiber networks, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications networks and technologies.

Media content processing subsystem 110 may be configured to process a media content stream provided by media content provider 111, including causing a media content instance, or one or more components (e.g., video and/or audio components) of a media content instance, to be presented for experiencing (e.g., viewing) by a user. Presentation of the media content instance may include, but is not limited to, displaying, playing back, or otherwise processing the media content instance, or one or more components of the media content instance, such that the media content instance may be experienced by the user. For example, media content processing subsystem 110 may provide one or more signals to a display 112 (e.g., a television, computer monitor, etc.) so that the display 112 may present (e.g., display) media content for experiencing by the user.

Media content processing subsystem 110 may be configured to process program guide data provided by media content provider 111, including generating and providing a program guide graphical user interface ("GUI") for presentation to the user. For example, media content processing subsystem 110 may provide one or more signals to the display 112 so that the display 112 may present the program guide GUI to the user. The program guide GUI may include a view of at least a portion of a program guide or a condensed program guide to be presented for viewing by a user.

As shown in FIG. 1, and as will be described in more detail below, media content processing subsystem 110 may be at least partially controlled by a user input device 113 (e.g., a remote control device). In certain examples, user input device 113 may include input mechanisms by which a user can utilize features and/or services provided by media content processing subsystem 110. For example, a user may utilize user input device 113 to navigate a program guide and/or provide input that may be used to search and/or filter the program guide.

While an exemplary media content access system 100 is shown in FIG. 1, the exemplary components illustrated in FIG. 1 are not intended to be limiting. Additional or alternative components and/or implementations may be used. Components of system 100 will now be described in additional detail.

Media content provider 111 may be configured to provide various types of media content and/or program guide data to media content processing subsystem 110 using any suitable communication technologies, including any of those disclosed herein. The media content may include one or more media content instances, or one or more segments of the media content instance(s). The term "media content instance" as used herein refers generally to any television program, on demand program, pay-per-view program, broadcast media program, IPTV content, commercial, advertisement, video, movie, song, video game, image, photograph, sound, or any segment, component, or combination of these or other forms of media content that may be viewed or otherwise experienced by a user.

The program guide data may include any information descriptive of content channels, programming time slots, media content instances, metadata for the media content instances, and relationships between the content channels, time slots, and media content instances. The term "content channel" will be used herein to refer generally to any carrier of media content, including, but not limited to, media (e.g., television) channels, streams, addresses, frequencies or other carriers of media content. The term "programming time slot" will be used herein to refer generally to any period of time associated with a scheduled broadcast of media content. Typically, the program guide data is descriptive of a programming schedule, including media content instances and the time slots and content channels associated with scheduled broadcasts of the media content instances. Examples of program guides and program guide views presenting program guide data will be described in more detail below.

Figure 2:
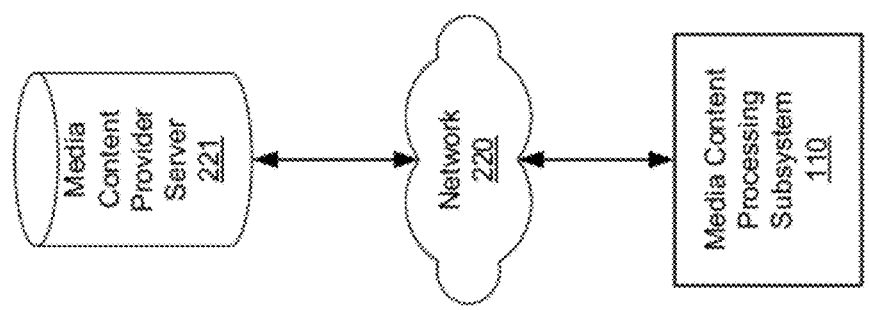
FIG. 2 illustrates an exemplary media content provider network.

An exemplary media content provider 111 may include a media content provider server 221, as shown in FIG. 2. Media content provider server 221 may be configured to communicate with media content processing subsystem 110 via one or more types of networks 220 (and communications links thereto). Network 220 shown in FIG. 2 may include, but is not limited to, the Internet, an intranet or other private packet-switched network, a wireless network (e.g., a wireless phone network or a Wi-Fi network), a cable television network (e.g., a hybrid fiber-coax network), a wireless broadcast network (e.g., a satellite media broadcasting network or terrestrial broadcasting network), a subscriber television network, a telephone network, a provider-specific network (e.g., a Verizon® FIOS® network and/or a TiVo network), an optical fiber network, any other suitable network, and any combination of these networks. In some alternative examples, media content processing subsystem 110 may be connected directly to media content provider server 221.

Figure 3:
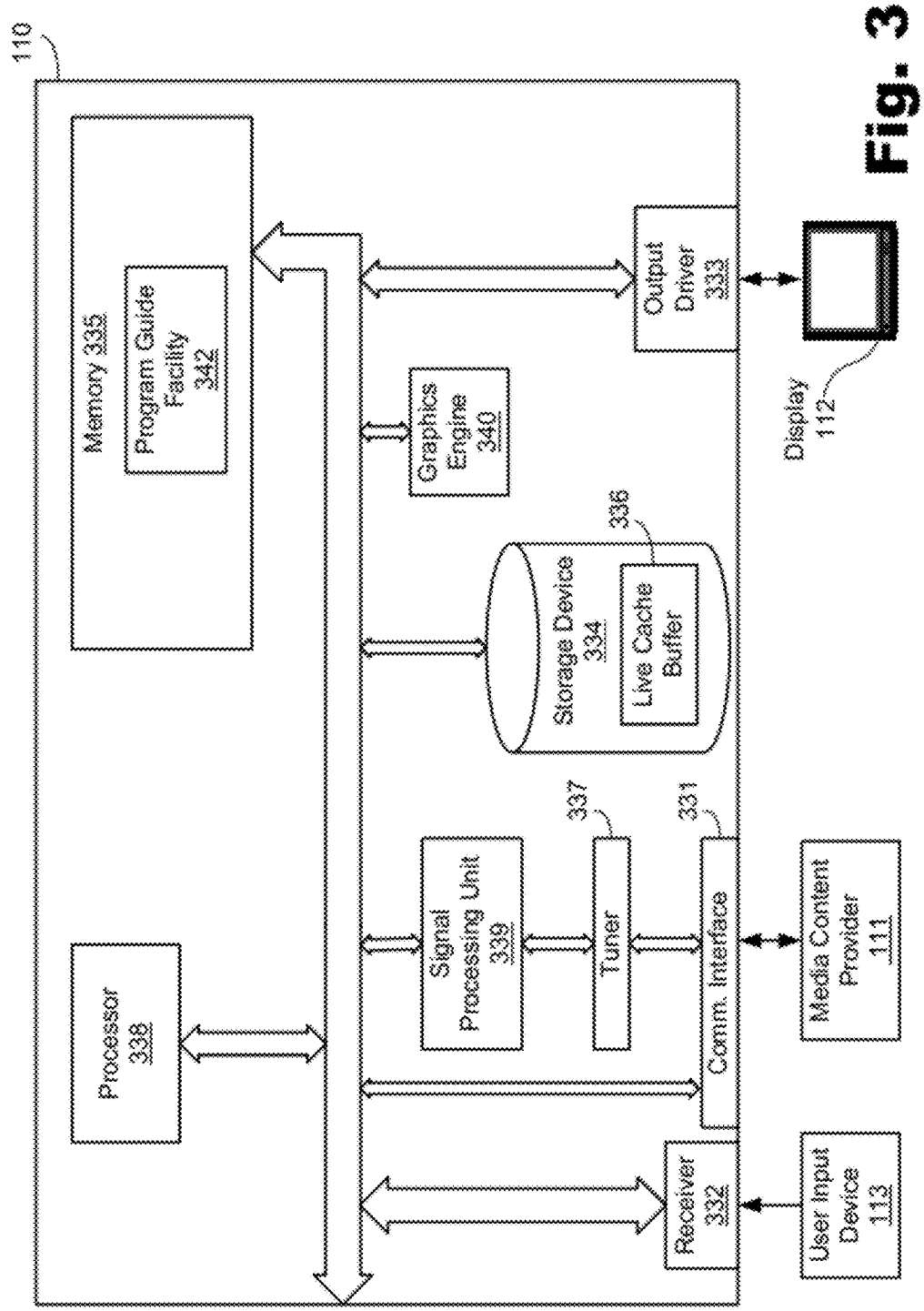
FIG. 3 illustrates an exemplary media content processing subsystem.

FIG. 3 illustrates exemplary components of media content processing subsystem 110 (or simply "processing subsystem 110"). Processing subsystem 110 may include any hardware, software, and firmware, or combination or sub-combination thereof, configured to process media content and/or program guide data for presentation to a user. The media content and/or program guide data may be received from media content provider 111 and provided to display 112 for presentation to the user. As used herein and in the appended claims, unless otherwise specifically denoted, the terms "media content processing subsystem" and "processing subsystem" refer expansively to all possible receivers configured to receive and process digital and/or analog media content, as well as program guide data. Processing subsystem 110 may include, but is not limited to, a set-top box ("STB"), home communication terminal ("HCT"), digital home communication terminal ("DHCT"), stand-alone personal video recorder ("PVR"), DVD player, handheld entertainment device, gaming device, video-enabled phone (e.g., a mobile phone), and personal computer.

In certain embodiments, processing subsystem 110 may include any computer hardware and/or instructions (e.g., software), or combinations of software and hardware, configured to perform the processes described herein. In particular, it should be understood that processing subsystem 110 may be implemented on one physical computing device or may be implemented on more than one physical computing device. Accordingly, processing subsystem 110 may include any one of a number of computing devices, and may employ any of a number of computer operating systems, including, but by no means limited to, known versions and/or varieties of Microsoft Windows, UNIX, Macintosh, and Linux operating systems.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110 is shown in FIG. 3, the exemplary components illustrated in FIG. 3 are not intended to be limiting. Additional or alternative components and/or implementations may be used in other embodiments. Components of the processing subsystem 110 will now be described in additional detail.

As shown in FIG. 3, processing subsystem 110 may include a communication interface 331 configured to receive content (e.g., media content) and/or data (e.g., program guide data) in any acceptable format from media content provider 111 or from any other suitable content source.

Communication interface 331 may include any device, logic, and/or other technologies suitable for receiving signals and/or data representative of media content and/or other types of content or data. Communication interface 331 may be configured to interface with any suitable communication media, protocols, and formats, including any of those mentioned above.

Processing subsystem 110 may also include a receiver 332 configured to receive user input signals (e.g., program guide filter commands) from user input device 113. User input device 113 may include, for example, a remote control device or any other suitable input device and may be configured to communicate with receiver 332 via a wireless link, electrical connection, or any other suitable communication link.

Figure 4:
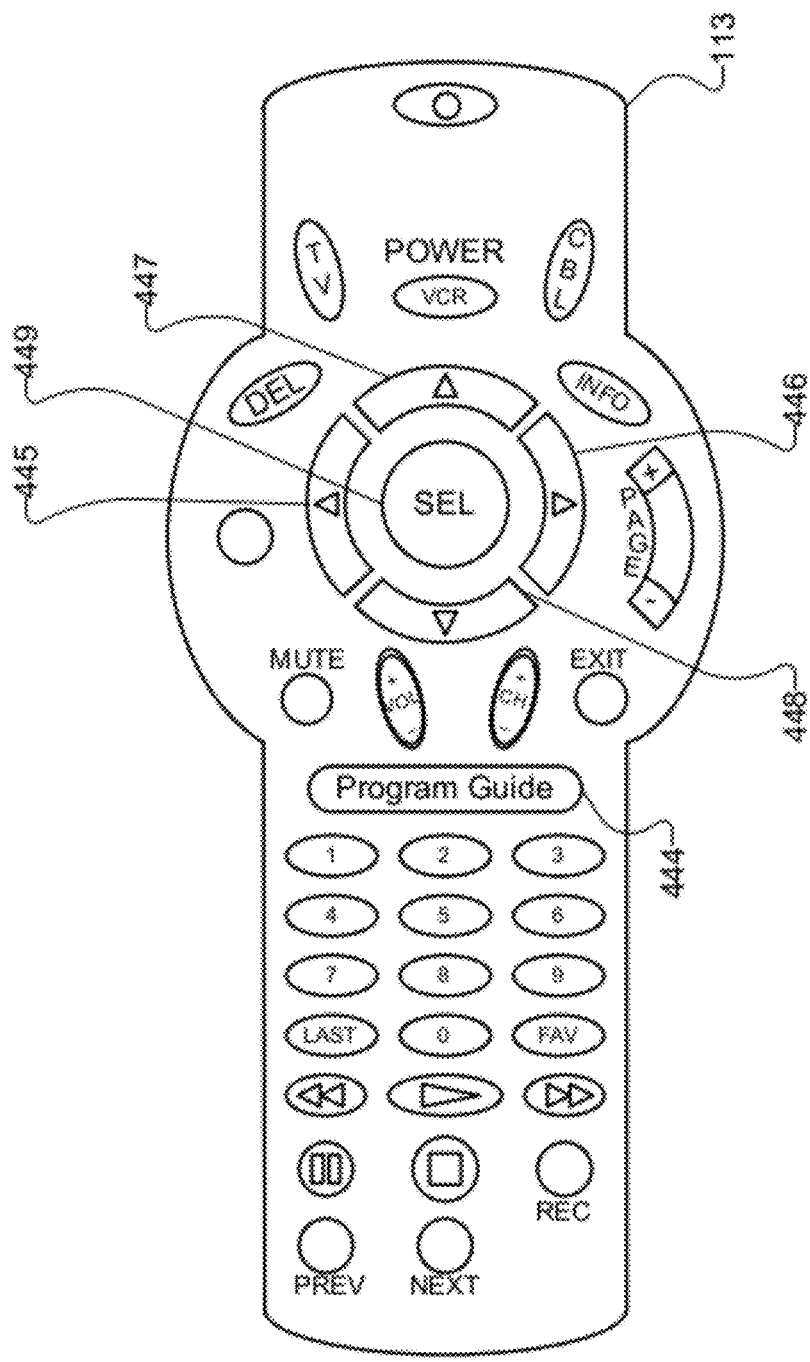
FIG. 4 illustrates an exemplary remote control user input device.

An exemplary remote control user input device 113 is illustrated in FIG. 4. In some examples, input device 113 may be configured to enable a user to control viewing options for experiencing media content and/or considering program guide data provided by processing subsystem 110. A program guide button 444 may be configured to evoke a presentation of a program guide GUI on display 112. A left button 445, right button 446, up button 447, down button 448, and select button 449 may be included and configured to enable the user to evoke and/or navigate through various views, options, and graphical user interfaces displayed by display 112. For example, buttons 445-449 may be configured to enable a user to utilize tools for navigating to different locations in a program guide, filtering the program guide, or searching for information in the program guide. In certain embodiments, a button on input device 113 may enable a user to toggle between different program guide views, as described below. In some example, us user may utilize input device 113 to provide data representative of user-defined media content recommendations to the processing subsystem 110. Input device 113 shown in FIG. 4 is merely illustrative of one of the many different types of user input devices that may be used to in connection with processing subsystem.

Returning to FIG. 3, processing subsystem 110 may include an output driver 333 configured to interface with or drive display 112. As instructed by one or more processors of the processing subsystem 110, output driver 333 may provide output signals to display 112, the output signals including content (e.g., media content and/or program guide content) to be presented by display 112 for experiencing by a user. For example, output driver 333 may provide a program guide GUI including a program guide view to display 112 for presentation to the user. Output driver 333 may include any combination of hardware, software, and/or firmware as may serve a particular application.

Storage device 334 may include one or more data storage media, devices, or configurations and may employ any type, form, and combination of storage media. For example, storage device 334 may include, but is not limited to, a hard drive, network drive, flash drive, magnetic disc, optical disc, or other non-volatile storage unit. Media content, program guide data, and other data may be temporarily and/or permanently stored in storage device 334.

Storage device 334 is shown to be a part of the processing subsystem 110 in FIG. 3 for illustrative purposes only. It will be understood that storage device 334 may additionally or alternatively be located external to processing subsystem 110.

Processing subsystem 110 may include memory 335. Memory 335 may include, but is not limited to, FLASH memory, random access memory ("RAM"), dynamic RAM ("DRAM"), other suitable computer-readable media, or any combination or sub-combination thereof. In some examples, various facilities (e.g., a program guide facility 342) used by the processing subsystem 110 may reside in memory 335.

Storage device 334 may include one or more live cache buffers 336. Live cache buffer 336 may additionally or alternatively reside in memory 335 or in a storage device external to processing subsystem 110. In some examples, media content and/or program guide data may be temporarily stored in live cache buffer 336 to facilitate viewing of the media content and/or program guide data.

Tuner 337 may be configured to selectively receive content (e.g., media content) carried on a particular content channel. For example, tuner 337 may be tuned to a particular content channel such that the content carried on the content channel is received and may be processed by processing subsystem 110.

In some examples, processing subsystem 110 may include multiple tuners 337 such that content carried on different content channels may be concurrently received by the processing subsystem 110. For example, processing subsystem 110 may include a first tuner configured to receive content carried on an analog video signal and a second tuner configured to simultaneously receive content carried on a digital compressed signal.

In some examples, media content received at the tuner 337 is temporarily buffered, or stored, in the live cache buffer 336. If there are multiple tuners 337, there may be a live cache buffer 336 corresponding to each of the tuners 337.

While tuner 337 may be used to receive various types of content-carrying signals broadcast by media content provider 111, processing subsystem 110 may be configured to receive other types of content signals (including media content signals and/or program guide data signals) from media content provider 111 and/or other sources without using a tuner. For example, media content provider 111 may broadcast digital streams of data packets (e.g., Internet Protocol ("IP") based data packets) that can be received without using a tuner. For such types of content signals, communication interface 331 may receive and forward the signals directly to other components of processing subsystem 110 (e.g., processor 338 or signal processing unit 339) without the signals going through tuner 337. For an IP-based signal, for example, signal processing unit 339 may function as an IP receiver.

Processing subsystem 110 may include at least one processor, such as processor 338, configured to control operations of processing subsystem 110. Processing subsystem 110 may also include a signal processing unit 339 configured to process incoming media content. Signal processing unit 339 may be configured, for example, to demodulate and parse encoded digital media content. In some examples, processing subsystem 110 may include one or more signal processing units 339 corresponding to each of the tuners 337. Program guide data received from the media content provider 111 may be processed by signal processing unit 339, processor 338, and/or any other suitable component(s) of processing subsystem 110.

Processing subsystem 110 may include a graphics engine 340 configured to generate graphics that can be displayed by the display 112. The graphics may include graphical user interfaces such as, but not limited to, one or more program guide GUIs including various views of program guide data (e.g. program guide views and condensed program guide views), program guide navigation, search, and/or filter tools, navigation palettes including program guide navigation tools, selectors for navigating and highlighting selectable options, visual indicators of interstitial symbols included in condensed program guides, and other graphics.

One or more facilities (e.g., software applications) residing within processing subsystem 110 may be executed upon initiation by a user of the processing subsystem 110, or upon the occurrence of another predetermined event. The facilities may reside in memory 335 or in any other area of the processing subsystem 110 and be executed by processor 338.

As shown in FIG. 3, processing subsystem 110 may include a program guide facility 342, which may reside in memory 335. Program guide facility 342 may be configured to instruct one or more components of processing subsystem 110 (e.g., processor 338 and/or graphics engine 340) to generate and provide data representative of a program guide, a condensed program guide, and/or a program guide GUI including a view of at least a portion of the program guide or condensed program guide. Processing subsystem 110 may provide the program guide GUI to display 112 for presentation to a user. The program guide GUI may include a view of at least a portion of a program guide, and thus may be used to present program guide views for experiencing by a user. Program guides, program guide GUIs, and/or program guide views may be generated from program guide data stored in processing subsystem 110 (e.g., in storage device 334) and/or program guide data received from an external source such as media content provider 111.

Program guide facility 342 may be launched or executed by receipt of a predetermined user input signal. For example, when a user selects program guide button 444 of user input device 113 shown in FIG. 4, program guide facility 342 may launch and instruct processor 338 and/or graphics engine 340 to generate a program guide GUI including data representative of a view of at least a portion of a program guide. The program guide GUI may be provided to output driver 333, which can provide a signal including data representative of the program guide GUI to display 112 for presentation to the user. As described below, program guide facility 342 may process input signals received from the user input device 113 and cause the program guide and/or a view of the program guide to be updated accordingly. For example, a program guide, which may be referred to as a first program guide, may be modified to form a condensed program guide based on user input, such as user input relating to a program guide search or filter operation.

To facilitate an understanding of program guide facility 342, program guides, program guide GUIs, and exemplary program guide views, FIG. 5A through FIG. 10 illustrate various respective examples of program guides, condensed program guides, program guide GUIs, and program guide views that processing subsystem 110 may be configured to provide to display 112 for presentation to a user.

Figure 5A:
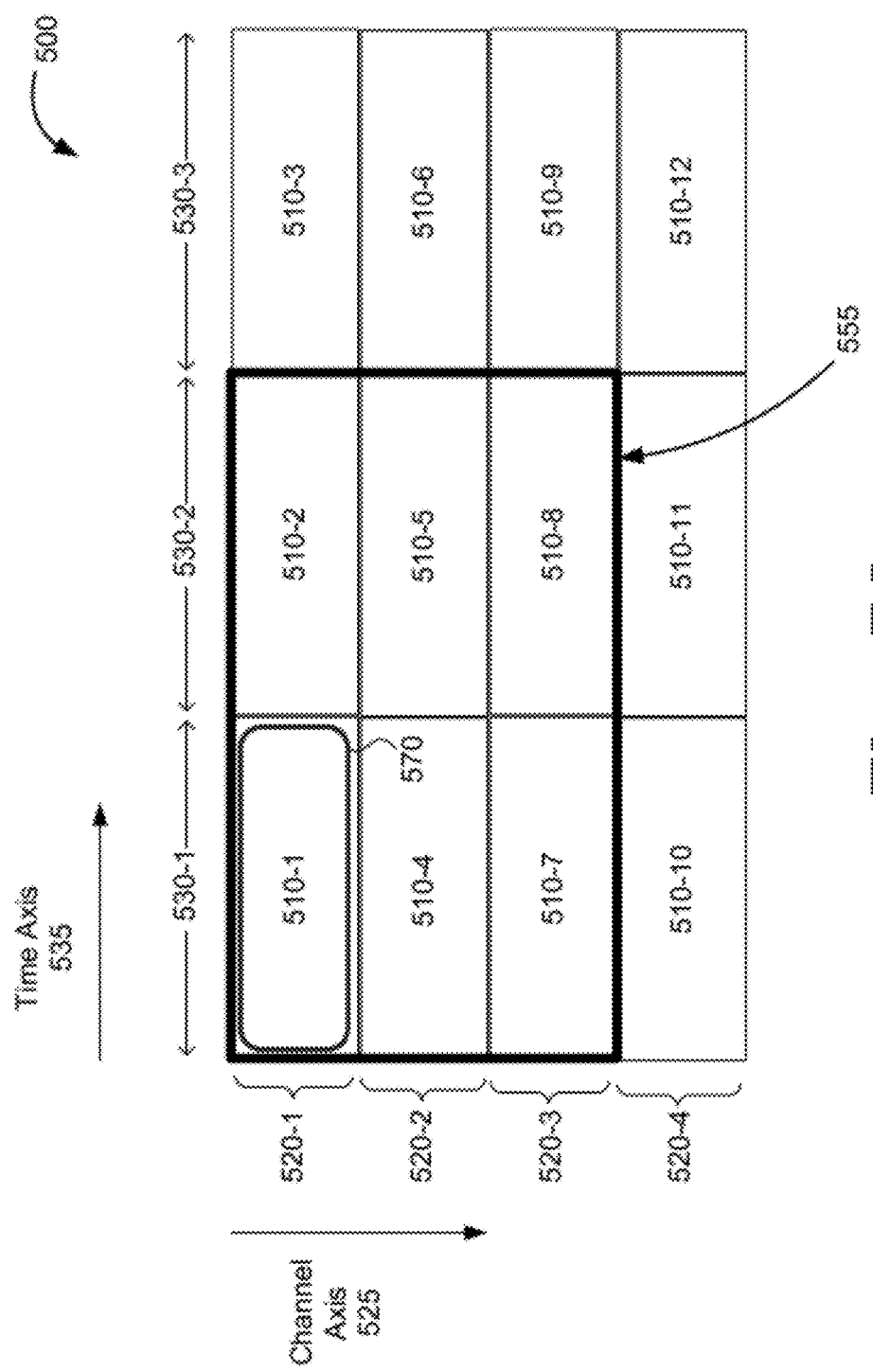
FIG. 5A illustrates an exemplary program guide having a matrix of cells.

FIG. 5A illustrates an exemplary program guide 500 that may be generated and provided by processing subsystem 110. As shown in FIG. 5A, program guide 500 may include a matrix of cells 510-1 through 510-12 (collectively "cells 510"). Cells 510 may be associated with respective media content instances and related metadata and programming information. In certain embodiments, for example, any particular cell 510 may be associated with a media content instance. For instance, cell 510-1 may be associated with a television program titled "DALLAS."

The cells 510 may be arranged in a program guide matrix based on attributes of the cells and/or the associated media content instances. For example, the cells 510 may be arranged in a matrix based on content channels carrying the corresponding media content instances and time slots representing the time periods during which the media content instances are scheduled for broadcast. As shown in FIG. 5A, content channels 520-1 through 520-4 (collectively "content channels 520") may be arranged along a channel axis 525, and time slots 530-1 through 530-3 (collectively "time slots 530") may be arranged along a time axis 535 to form a matrix grid of cells 510. In the example shown in FIG. 5A, the channel axis 525 is disposed vertically and the time axis 535 is disposed horizontally. This is illustrative only. Other dispositions of axes may be used in other embodiments.

In program guide 500, any particular cell 510 may be associated with a content channel and one or more time slots respectively indicative of the content channel carrying the corresponding media content instance and the time period during which the media content instance is scheduled for broadcast. As an example, the position of cell 510-1 in the program guide matrix represents that the corresponding media content instance (e.g., a television program titled "DALLAS") is scheduled to be broadcast on content channel 520-1 during time slot 530-1. Accordingly, the cells 510 may be arranged in the matrix grid based on content channels 520 and time slots 530.

In the program guide 500 matrix of FIG. 5A, each of the cells 510 is spatially substantial. That is, each of the cells 510 occupies a grid space in the matrix. Each matrix grid space is spatially positioned as an intersection area for a particular content channel 520 and time slot 530.

Program guide 500 is illustrative only. Typically, a program guide may include numerous cells 510 associated with numerous media content instances, content channels 520, and time slots 530. To illustrate, a program guide may include program guide data representing scheduled programming for hundreds of content channels and for any suitable period of time, including one day, two weeks, or a month of programming, for example.

Accordingly, a user may view different portions of a program guide, and only a portion of a program guide is typically included in any one view presented to a user. FIG. 5A illustrates a viewing area 555 representing a particular view of program guide 500 that may be presented to a user. As shown, cells 510-1, 510-2, 510-4, 510-5, 510-7, and 510-8 are included in viewing area 555, and cells 510-3, 510-6, 510-9, 510-10, 510-11, and 510-12 are outside of the viewing area 555. The particular cells 510 included in the viewing area 555 in FIG. 5A are associated with content channels 520-1, 520-2, and 520-3, and with time slots 530-1 and 530-2.

The portion of program guide 500 that is included in viewing area 555 may be determined based on a position of a program guide selector. FIG. 5A illustrates a selector 570 positioned at cell 510-1. The program guide view included in viewing area 555 may be determined based on the position of the selector 570. Media content processing subsystem 110 may be configured to move selector 570 to different cells 510 in the program guide 500 based on user input and to modify the program guide view presented in the viewing area 555 in response to the selector 570 changing positions in the program guide 500. Exemplary program guide GUIs will be described further below.

Media content processing subsystem 110 may be configured to modify program guide 500, or generate different versions of program guide 500, based on user input. For example, media content processing subsystem 110 may be configured to provide one or more tools configured to enable a user to search and/or filter the program guide 500. As an example, a user may utilize a filter tool to provide one or more parameters for filtering program guide 500. For instance, the user may wish to filter program guide 500 to include only cells 510 associated with media content instances that are "movies." Media content processing subsystem 110 may be configured to identify the "movie" media content instances and corresponding cells 510 included in program guide 500. The identified cells 510 may be a subset of all of the cells 510 included in program guide 500, and "non-movie" cells 510 not included in the subset may be filtered out of (i.e., removed from) program guide 500.

Media content processing subsystem 110 may be configured to generate a condensed version of program guide 500 that includes only the identified "movie" cells 510. The identified cells 510 may be condensed to fill in gaps left by the filtered cells, thereby forming a condensed program guide including a condensed matrix of "movie" cells 510.

Figure 5B:
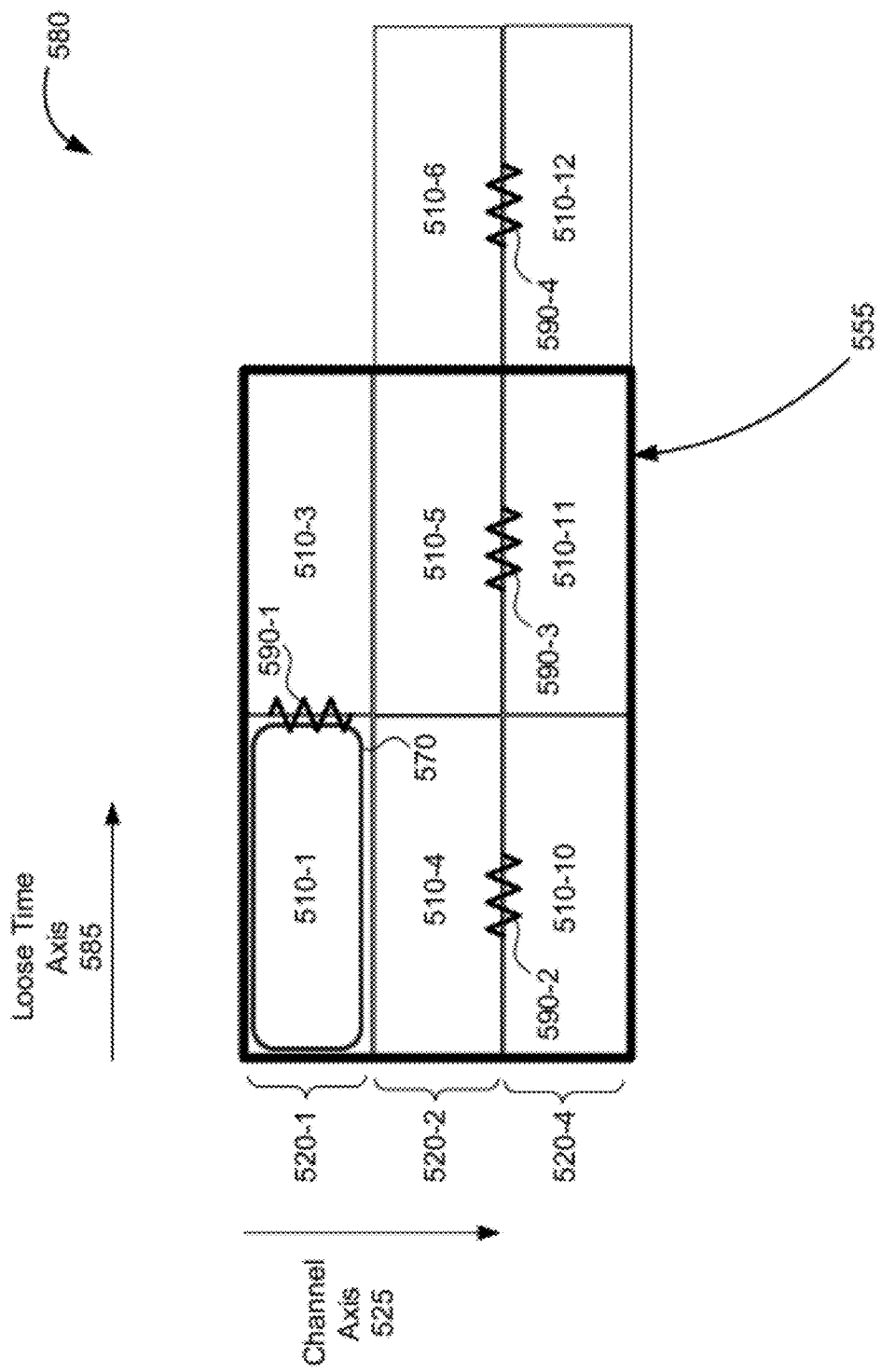
FIG. 5B illustrates an exemplary condensed program guide having a matrix of a subset of the cells included in the program guide of FIG. 5A.

FIG. 5B illustrates an exemplary condensed program guide 580, which is a condensed version of program guide 500 of FIG. 5A. As shown in FIG. 5B, program guide 580 includes cells 510-1, 510-3, 510-4, 510-5, 510-6, 510-10, 510-11, and 510-12. Hence, cells 510-2, 510-7, 510-8, and 510-9 of program guide 500 have been excluded from (i.e., filtered out of) condensed program guide 580.

As shown in FIG. 5B, the cells 510 included in condensed program guide 580 have been arranged to form a condensed matrix. Certain of the cells 510 have been repositioned to fill in spatial gaps left by the excluded cells. For instance, cell 510-3 has been moved adjacent to cell 510-1 to fill in a gap left by removal of cell 510-2, and cells 510-10, 510-11, and 510-12 have been moved adjacent to cells 510-4, 510-5, and 510-6, respectively, to fill in the respective gaps left by removal of cells 510-7, 510-8, and 510-9. Accordingly, one or more of the cells 510 included in condensed program guide 580 may be repositioned from their matrix positions in program guide 500 to form a condensed matrix in condensed program guide 580. For ease of explanation, and to help distinguish from cells 510 included in condensed matrices and cells excluded from condensed matrices, general references to excluded or removed cells will not include reference numbers. References to specific cells that have been excluded will include reference numbers.

Cells 510 may be repositioned along the channel axis 525, time axis 535, or both the channel 525 and time 535 axes. In FIG. 5B, cells 510-10, 510-1, and 510-12 provide an example of cells 510 being repositioned along the channel axis 525. In the illustrated example, cells 510-7, 510-8, and 510-9 in the row associated with content channel 520-3 have been excluded from condensed program guide 580, and cells 510-10, 510-11, and 510-12 in the row associated with content channel 520-4 have been repositioned (e.g., moved up) along the channel axis 525 to fill in the gap left by the content channel 520-3 row.

In FIG. 5B, cell 510-3 provides as example of a cell 510 being repositioned along a loose time axis 585. Cell 510-3 has been repositioned along the loose time axis 585 to fill in a gap left by removal of cell 510-2. The loose time axis 585 may be configured to accommodate for unaligned time slots produced by the condensing of cells 510. In condensed program guide 580, for example, the cells 510 in a particular column may not all be associated with the same time slot 530. For instance, the middle column of condensed program guide 580 includes cells 510-3, 510-5, and 510-11. While cells 510-5 and 510-11 are both associated with the same time slot 530-2 (see FIG. 5A), cell 510-3 is associated with a different time slot 530-3 (see FIG. 5A). Accordingly, the loose time axis 585 may enable time slots 530 to be associated with particular cells 510 rather than with columns of cells 510 in the condensed program guide 580. This allows for cells 510 to be individually collapsed along the loose time axis 585 to fill in spatial gaps left by excluded cells 510.

Media content processing subsystem 110 may be configured to account for the loose time axis 585 when providing program guide views for presentation to a user. For example, a particular view of the condensed program guide 580 may display time slot information individually for each included cell 510. Alternatively or additionally, a view of the condensed program guide 580 may provide time slot information based on a position of selector 570. For example, with selector 570 positioned at cell 510-1 in the row associated with content channel 520-1, programming time slot information for cells 510-1 and 510-3 in the row may be displayed. Accordingly, programming time slot information for time slots 530-1 and 530-3 may be displayed in viewing area 555. If the selector 570 is moved to cell 510-4 in the row associated with content channel 520-2, programming time slot information for cells 510-4 and 510-5 in the row may be displayed. Accordingly, programming time slot information for time slots 530-1 and 530-2 may be displayed in viewing area 555. An example of programming time slot information being displayed in a program guide GUI based on a position of selector 570 will be described further below in reference to FIGS. 9-10.

Cells 510 may be condensed in accordance with a predefined condensing heuristic, which may guide how cells 510 are repositioned to form condensed program guide 580. For example, a predefined condensing heuristic may direct that cells 510 be moved in certain directions (e.g., left or right along the time axis 535 and up or down along the channel axis 525) to fill in gaps left by removed cells. In certain embodiments, the predefined condensing heuristic may direct that cells 510 be moved toward selector 570 to fill in spatial gaps. That is, the selector 570 may function as a source of virtual gravity configured to pull cells 510 toward the selector 570 to fill in spatial gaps in the matrix of cells 510.

The predefined condensing heuristic may prioritize certain directions of movement over others. For example, cells 510 may be repositioned along the time axis 535 first to fill in gaps before cells 510 may be repositioned along the channel axis 525 to fill in gaps. Accordingly, the predefined condensing heuristic may be configured to remove content channel 520 row and condense the matrix by filling in the gap only when there are no cells left in that row. If there are cells 510 left in the row, they may be repositioned along the time axis 535 to fill in the gaps in the row.

In FIG. 5B, viewing area 555 includes another program guide view having cells 510-1, 510-3, 510-4, 510-5, 510-10, and 510-11 arranged as shown. This view may be referred to as a condensed program guide view inasmuch as it is a view of at least a portion of condensed program guide 580.

As shown in FIG. 5B, condensed program guide 580 may include one or more graphical interstitial symbols 590-1 through 590-4 (collectively "interstitial symbols 590"), which may represent cells that have been excluded from the condensed program guide 580. For example, an interstitial symbol 590-1 may be included to represent excluded cell 510-2.

In some examples, each interstitial symbol 590 may be positioned to indicate a matrix position of a corresponding excluded cell relative to at least one other cell 510 included in the condensed program guide 580. In FIG. 5B, for example, interstitial symbol 590-1 representing excluded cell 510-2 is positioned at least proximate to a boundary (e.g., a boundary edge) between adjacent cells 510-1 and 510-3. Accordingly, interstitial symbol 590-1 may indicate that the matrix position of the excluded cell 510-2 is between cells 510-1 and 510-3. Similarly, other interstitial symbols 590 may be positioned to indicate matrix positions of the other excluded cells (e.g., cells 510-7, 510-8, and 510-9).

Hence, interstitial symbols 590 may enable a user of media content processing subsystem 110 to conveniently identify cells that have been excluded from a condensed program guide 580, as well as matrix positions from which the excluded cells were removed. As shown in FIG. 5B, interstitial symbols 590 may include and/or be in the form of one or more visual graphics ("visual indicators") that may be displayed within condensed program guide 580. While FIG. 5B illustrates a particular visual indicator used for interstitial symbols 590, this is illustrative only. Other embodiments may use other visual indicators for the interstitial symbols 590.

Interstitial symbols 590 may be spatially insubstantial in condensed program guide 580. That is, the interstitial symbols 590 may be included in (e.g., displayed within) condensed program guide 580 without occupying grid spaces in the condensed matrix. For example, the interstitial symbols 590 may not be associated with content channels 520, time slots 530, or the grid areas at the intersections of content channels 520 and time slots 530. Instead, the interstitial symbols 590 may be positioned at boundary edges (e.g., as overlays along the edges) of the grid spaces or cells 510. Accordingly, the condensed program guide 580 may include a condensed matrix having indicators of removed cells that do not occupy, or occupy only insubstantial, grid space.

In some embodiments, interstitial symbols 590 may include one or more selectable objects. Accordingly, a user may be able to navigate to and select an interstitial symbol 590 in a program guide view. This may be configured to enable the user, from a condensed program guide view, to utilize an interstitial symbol 590 to conveniently access information related to a cell that has been excluded from the condensed program guide 580. In certain embodiments, when a user selects a selectable interstitial symbol 590, a corresponding excluded cell and/or information related to the cell may be presented. In some examples, this may include adding the excluded cell to the condensed matrix of cells 510 in the condensed program guide 580. For example, cell 510-3 may be returned to its previous position and previously excluded cell 510-2 may be reinserted between cells 510-1 and 510-3. In other examples, presentation of the excluded cell may include launching and presenting a pop-up window including information and/or options related to the cell.

Interstitial symbols 590 may be inserted in condensed program guide 580 in accordance with a predefined stitching heuristic, which may indicate where in the condensed program guide 580 the interstitial symbols 590 will be positioned. In certain embodiments, for example, an interstitial symbol 590 may be generated and positioned at the location of the corresponding excluded cell. The interstitial symbol 590 may then be repositioned in accordance with the predefined condensing heuristic. For example, the interstitial symbol 590 may be moved in a predefined direction until it reaches an edge of an included cell 510. The interstitial symbol 590 may then be positioned proximate to and/or be associated with that particular edge. As another example, the cells 510 in the condensed program guide 580 may be condensed and one or more interstitial symbols 590 inserted into the condensed matrix proximate to boundaries of previously adjacent cells 510 included in the condensed matrix. Other stitching heuristics may be used in other implementations.

Figure 6:
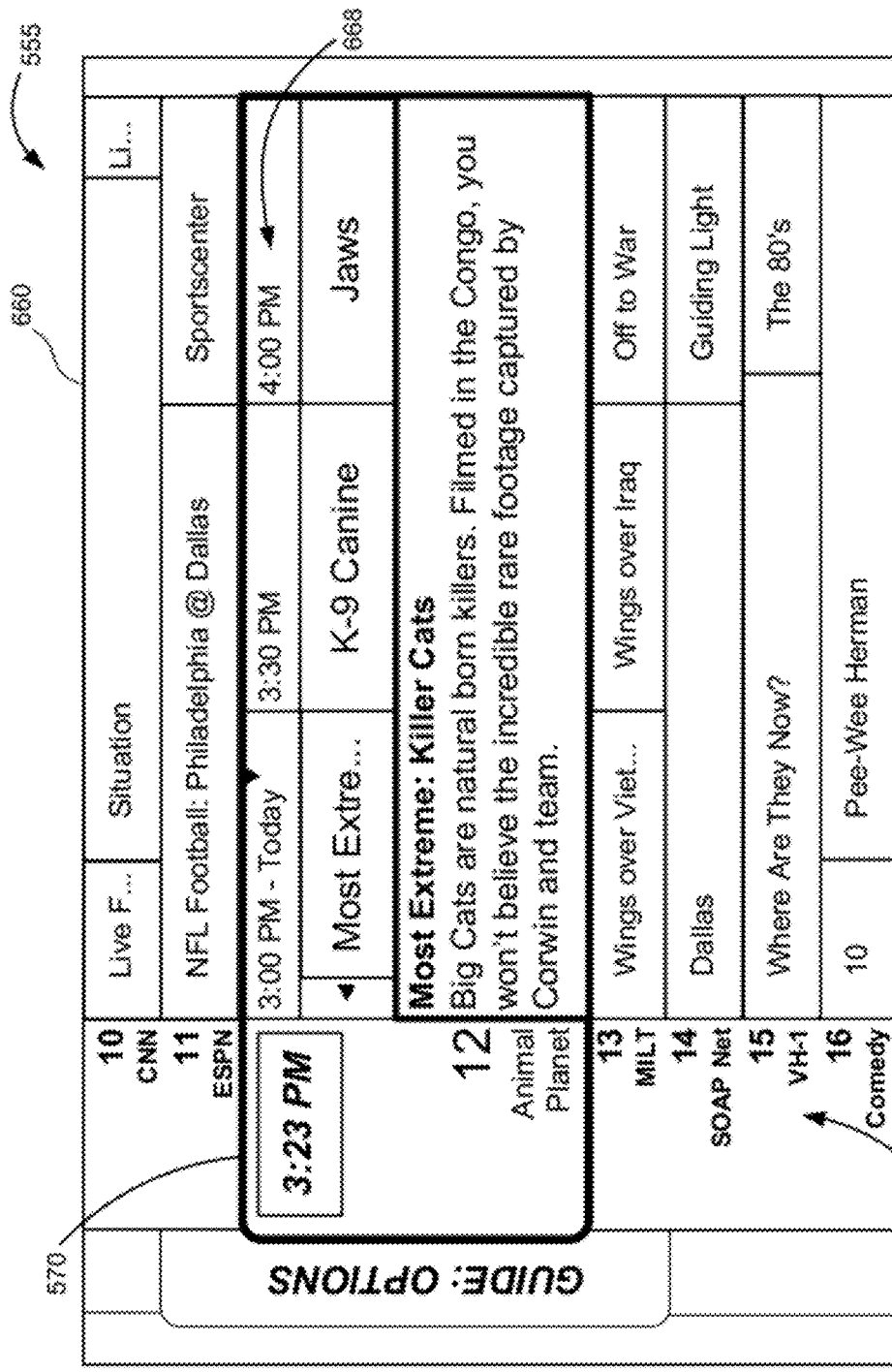
FIG. 6 illustrates an exemplary program guide view presented in a graphical user interface displayed in a viewing area of a display.

FIGS. 6-10 illustrate exemplary views of portions of a program guide and condensed program guides as they may be presented in viewing area 555. FIG. 6 illustrates an exemplary program guide graphical user interface ("GUI") 660 that may be displayed in viewing area 555, which may be an area of a display screen of display 112. Processing subsystem 110 may provide a signal carrying data representative of program guide GUI 660 to display 112 and for use by display 112 in presenting program guide GUI 660 for consideration by a user.

Program guide GUI 660 may include a view of at least a portion of a program guide, such as program guide 500. As shown in FIG. 6, program guide GUI 660 may include a list 664 of content channels 520, a list 668 of programming time slots 530, and a matrix of cells associated with media content instances and positioned relative to the content channels 520 and time slots 530.

Program guide GUI 660 may also include selector 570 configured to graphically depict which cell of the program guide matrix is currently highlighted. In FIG. 6, a cell associated with a media content instance titled "Most Extreme: Killer Cats" is highlighted by selector 570. When a cell is highlighted by selector 570, additional information associated with the cell may be displayed. For example, a synopsis of the "Most Extreme: Killer Cats" media content instance is displayed. The additional information may be obtained from metadata associated with the media content instance.

Selector 570 may be moved from cell to cell in accordance with user input commands. For example, the user may utilize buttons 445-449 of the user input device 113 shown in FIG. 4 to move the selector 570 up, down, left, or right, or to select a highlighted cell. When a highlighted cell is selected, the media content instance corresponding with the cell may be presented to the user. The view shown in program guide GUI 660 may be updated accordingly as selector 570 is moved about.

The program guide view shown in FIG. 6 may include a portion of a first program guide. In some examples, this program guide may be a "full" program guide including cells for all available media content instances. As shown in FIG. 6, the content channels 520 in list 664 are sequential in number, and the time slots 530 in list 668 are sequential by time slot. Accordingly, the program guide view may be referred to as being "full" or "unfiltered."

A user of media content processing subsystem 110 may wish to consider other program guide views, including filtered and/or condensed views of the first program guide. The media content processing subsystem 110 may be configured to provide one or more tools configured to enable the user to provide input that may be used to generate other views, including condensed program guide views. Examples of such tools may include, but are not limited to, filter, search, user profile (e.g., user profile favorites), and media content recommendation tools. For example, media content processing subsystem 110 may be configured to provide one or more tools enabling one or more users to provide user input "recommending" or otherwise identifying certain media content instances. Recommendation data may be used to filter a program guide and generated a condensed program guide including a matrix of cells corresponding with recommended media content instances. The condensed program guide may include recommendations for one or more users or user profiles. Similarly, user input such as search, filter, and/or user profile based parameters may be used to identify matching media content instances and to generate condensed program guides including matrices of cells corresponding to the identified media content instances.

Figure 7:
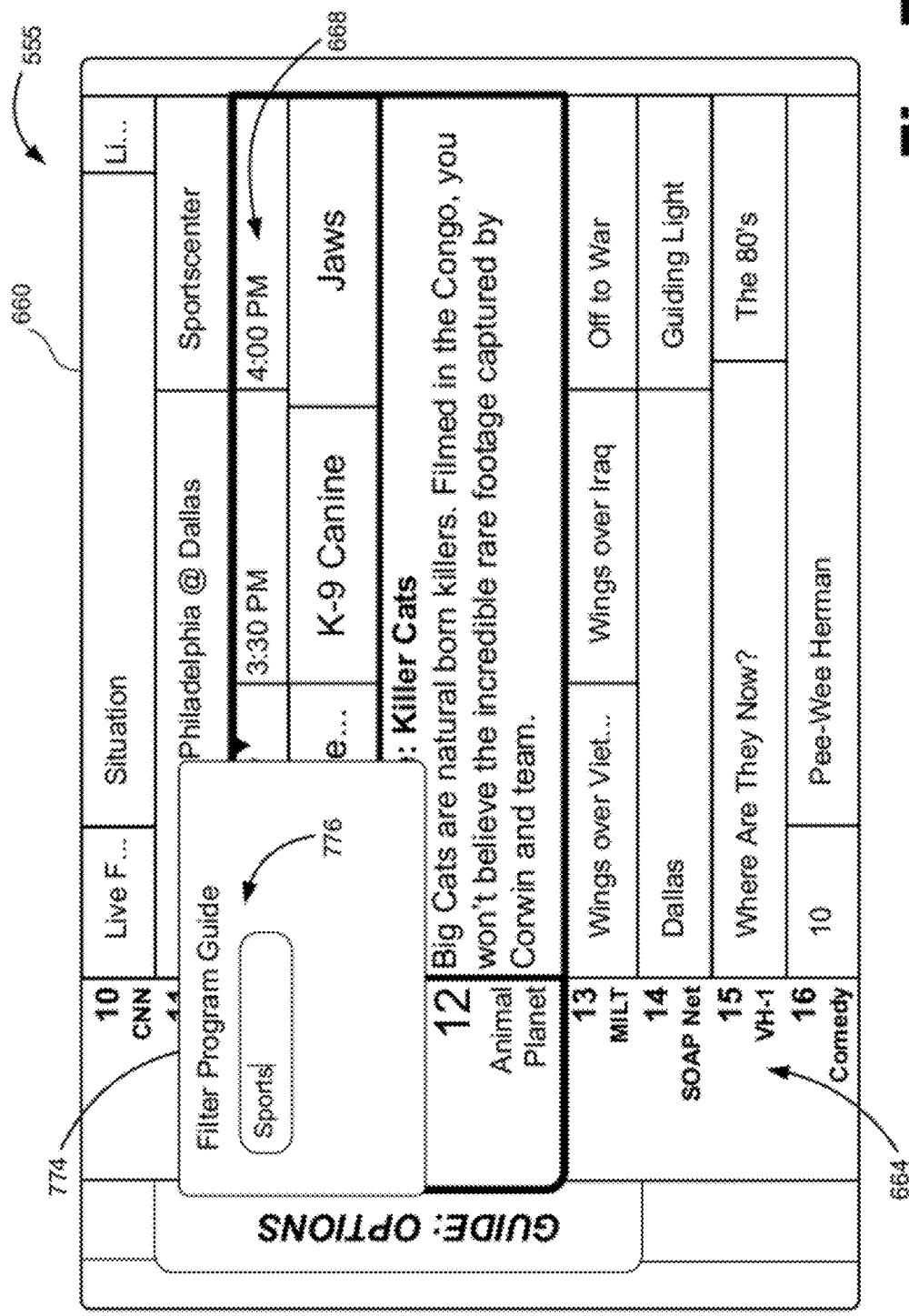
FIG. 7 illustrates an exemplary program guide filter tool displayed in the viewing area of FIG. 6.

FIG. 7 illustrates the program guide GUI 660 of FIG. 6 with an exemplary program guide filter palette 774 displayed therein. Palette 774 may be launched in response to processing subsystem 110 detecting an occurrence of a predetermined event. The predetermined event may include receipt of any suitable predefined user input. For example, when viewing the program guide GUI 660 of FIG. 6, a user may actuate a predetermined button on the user input device 113 to cause palette 774 to be launched. As shown, palette 774 may include an overlay covering only a relatively small area of the program guide view in the program guide GUI 660.

As shown in FIG. 7, palette 774 may include a program guide filter tool 776. Filter tool 776 may enable a user to provide one or more parameters (e.g., keywords, genres, etc.) for filtering program guide data. In certain embodiments, filter tool 776 may enable the user to spell out keywords or other filter parameters. In other embodiments, filter tool 776 may enable the user to select from a group of predetermined filter parameters. In some examples, content processing subsystem 110 may be configured to dynamically filter program guide data based on user input that is provided via the filter tool 776. Accordingly, the content displayed in the program guide GUI 660 may be dynamically updated as the user provides filter parameters.

In the example shown in FIG. 7, a provided filter parameter includes the word "Sports." Accordingly, cells associated with sports-related media content instances may be identified and the program guide filtered to include only the identified cells, which may be a subset of the cells initially included in the program guide. Cells associated with media content instances that are not related to sports may be filtered (e.g., removed) from the program guide to create a filtered program guide. The filtering of cells may be performed in any suitable way, including comparing user-specified filter parameters with media content metadata to identify cells to be included in the filtered program guide.

The filtered program guide may be condensed in any of the ways described above to form a condensed program guide, which may be described as a filtered, condensed version of the first program guide. A view of at least a portion of the condensed program guide may be provided for presentation in program guide GUI 660.

Figure 8:
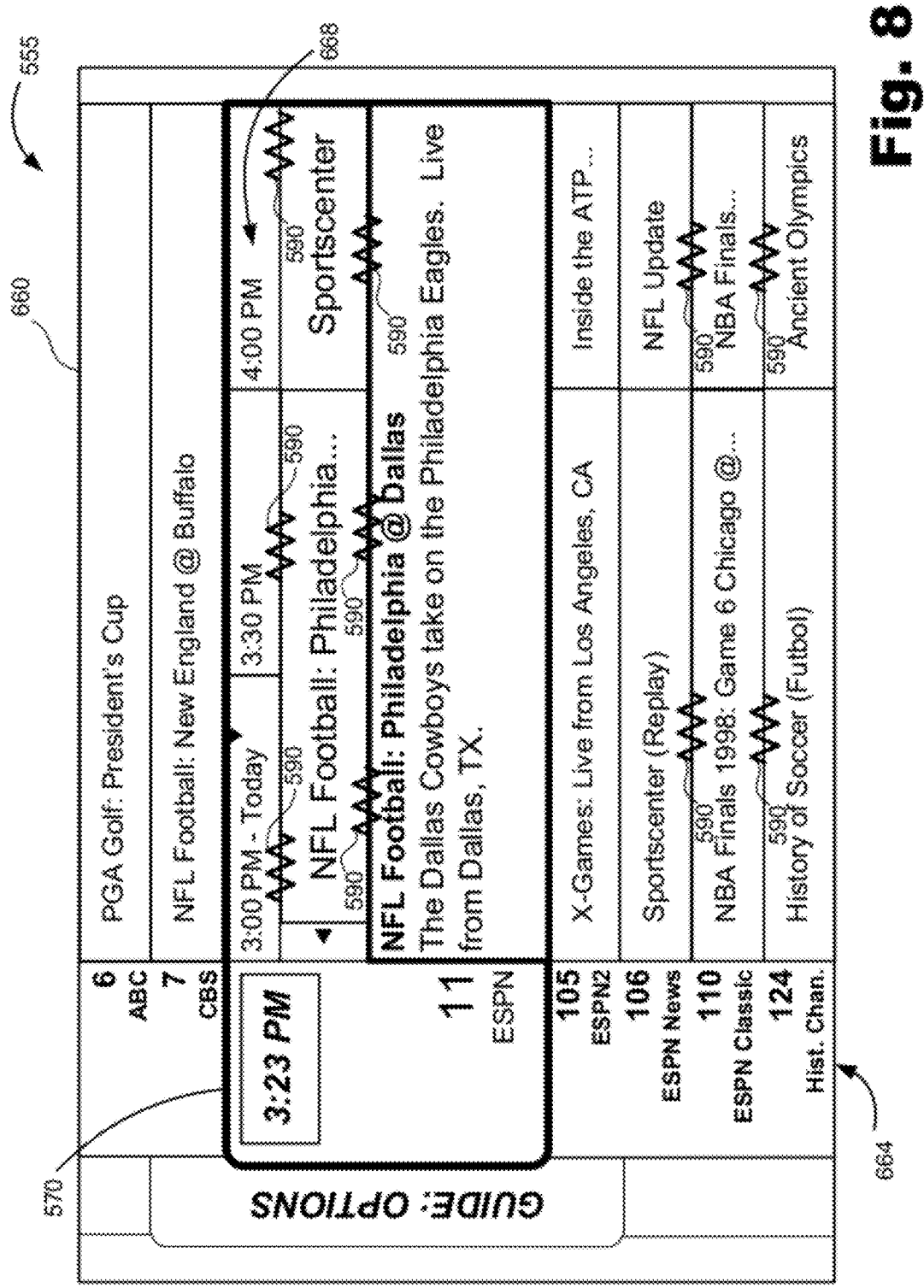
FIG. 8 illustrates an exemplary condensed program guide view displayed in the viewing area of FIG. 6.

FIG. 8 illustrates an exemplary condensed program guide view as may be presented in viewing area 555. The view shown in FIG. 8 may be provided in response to execution of the filter operation described in relation to FIG. 7. As shown, program guide cells associated with sports media content are included in the view of FIG. 8, and other program guide cells not associated with sports media content are excluded from the view in FIG. 8.

In the illustrated example, each of the excluded cells is part of an entire row that has been excluded. Specifically, content channels 520 numbered 10, 12, 13, 14, 15, and 16 in FIG. 6 have been removed in FIG. 8. The included cells have been condensed to fill in the gaps left by the excluded cells. Specifically, content channels 520 numbered 6, 7, 105, 106, 110, and 124 have been moved within the program guide view shown in FIG. 8. Selector 570 has been moved to a cell within content channel 520 row having channel number 11. This cell is associated with a media content instance titled "NFL Football: Philadelphia @ Dallas." When selector 570 is initially positioned on a cell in the first program guide and the cell is excluded from the condensed program guide, media content processing subsystem 110 may automatically reposition selector 570 based on the predefined condensing heuristic. In FIG. 8, selector 570 has been moved to a cell determined to be nearest to the previous position of the selector 570.

As shown in FIG. 8, the condensed program guide view may include interstitial symbols 590 representing cells that have been excluded from the condensed program guide. In the program guide GUI 660, the interstitial symbols 590 may provide visual indicators indicating matrix positions of the excluded cells. The interstitial symbols 590 may be positioned and configured in any of the ways described above.

The condensed program guide view of FIG. 8 illustrates a program guide view that is the result of a first program guide view having been filtered and condensed along a channel axis 525. This is illustrative only. In other examples, the first program guide view may be filtered and condensed along a time axis 535, or along both the channel 525 and time 535 axes, to form a condensed program guide.

Figure 9:
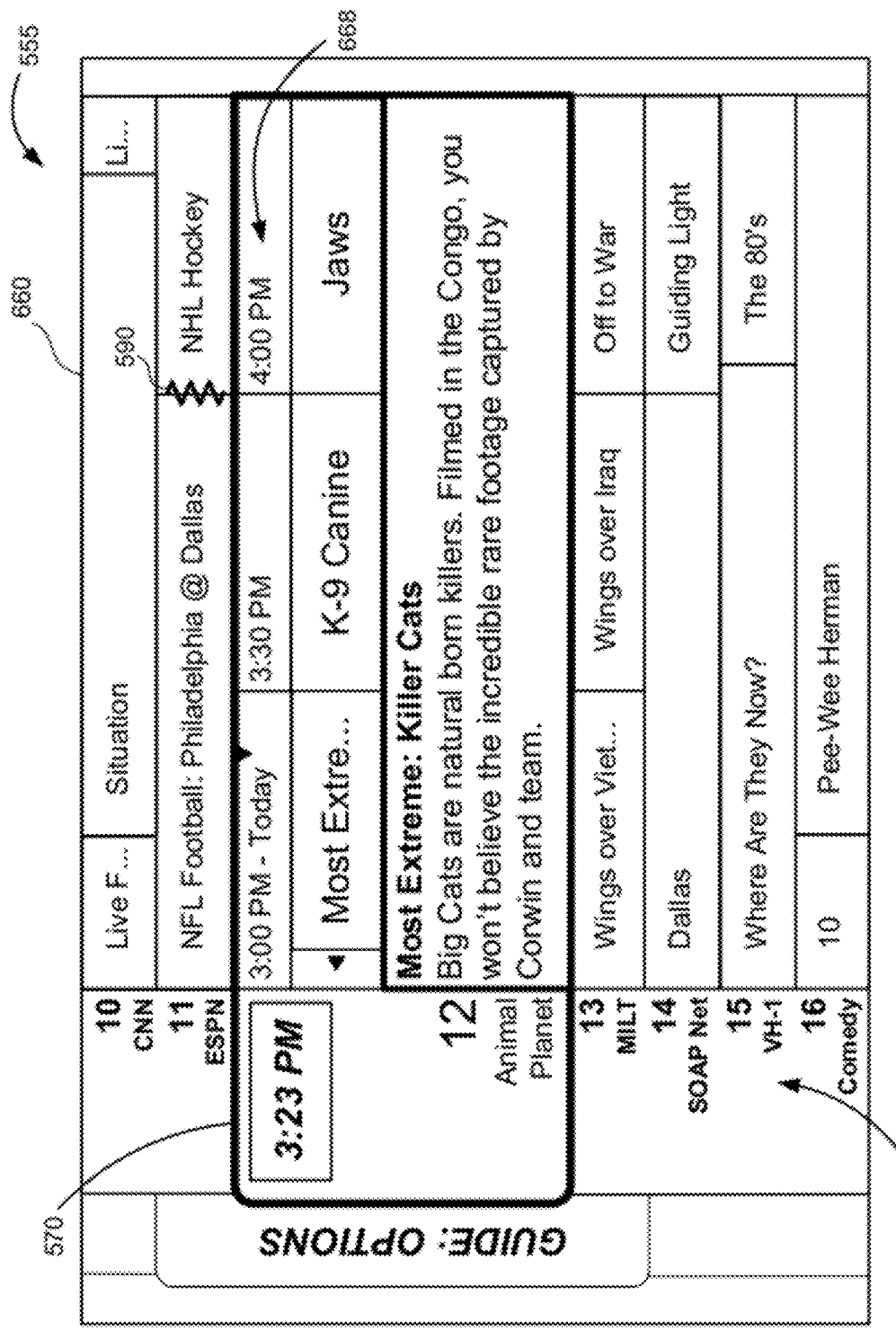
FIG. 9 illustrates another exemplary condensed program guide view displayed in the viewing area of FIG. 6.

FIG. 9 illustrates another exemplary condensed program guide view. To generate the view shown in FIG. 9, a particular cell has been filtered from the view shown in FIG. 6 and excluded from the view shown in FIG. 9. The remaining included cells have been condensed. Specifically, a cell associated with a media content instance titled "Sportscenter" has been excluded. Another cell adjacent to the "Sportscenter" cell (but outside of the view area 555 of FIG. 6) has been repositioned to fill in the gap left by removal of the "Sportscenter" cell. The repositioned cell is associated with a media content instance titled "NHL Hockey." The condensed program guide view of FIG. 9 includes an interstitial symbol 590 representing the excluded "Sportscenter" cell.

Figure 10:
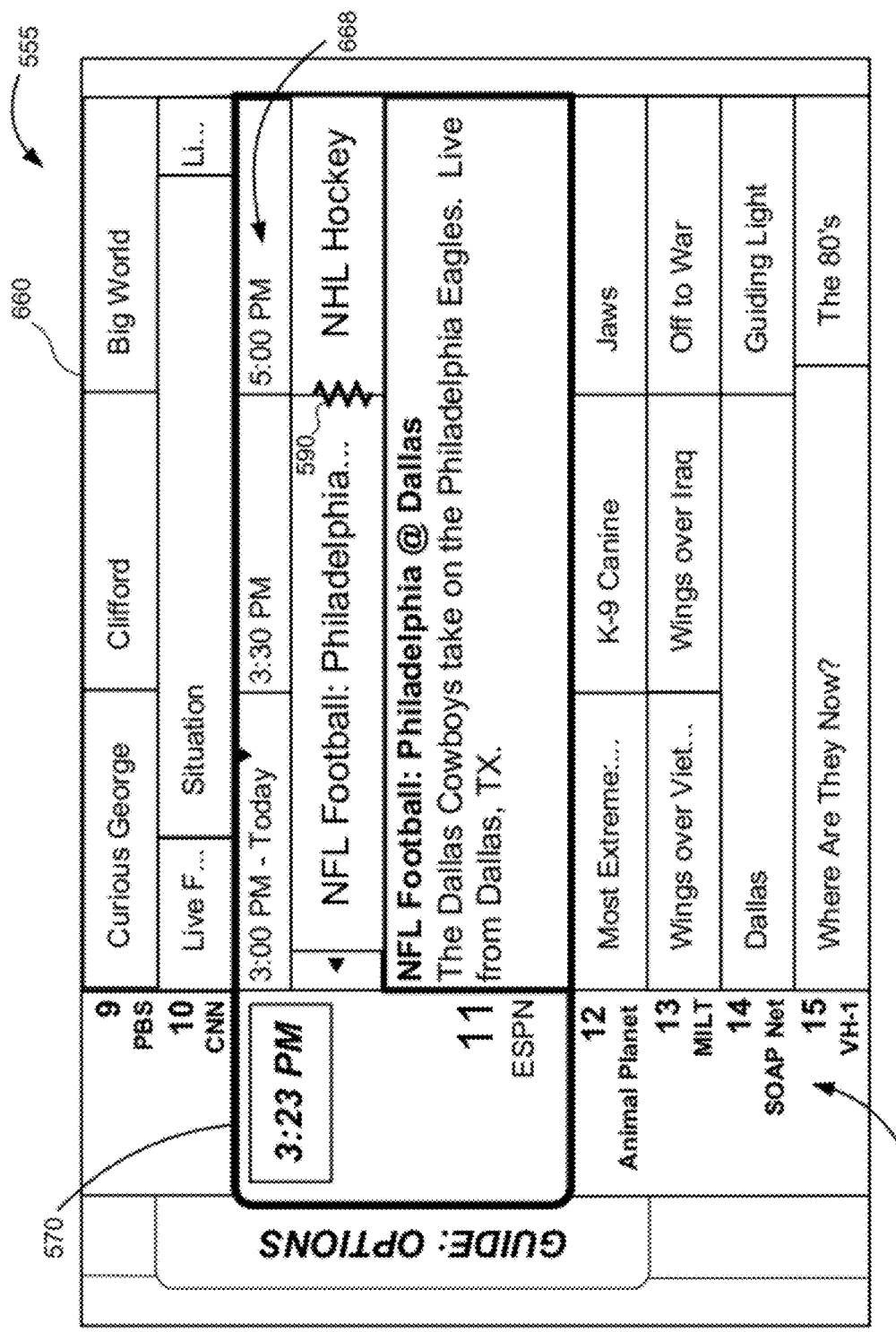
FIG. 10 illustrates the exemplary condensed program guide view of FIG. 9 with a selector repositioned at another cell.

As described above, a time axis for a condensed program guide may be defined loosely. FIG. 9 includes a list 668 of programming time slots 530 associated with the content channel 520 row including the cell currently highlighted by selector 570. If the selector 570 is moved to another content channel 520 row, the time slots 530 included in the list 668 may be adjusted based on the cells in the newly highlighted row. For example, if the selector 570 is moved from the cell associated with the media content instance titled "Most Extreme: Killer Cats" to the cell associated with the media content instance titled "NFL Football: Philadelphia @ Dallas" in the program guide view of FIG. 9, the list 668 of time slots 530 may be adjusted based on the time slots 530 associated with the cells in the content channel 520 row numbered 11. FIG. 10 illustrates this example. As shown in FIG. 10, the list 668 of time slots 530 includes 3:00 pm and 3:30 pm time slots for the "NFL Football: Philadelphia @ Dallas" cell, and a 5:00 pm time slot for the "NHL Hockey" cell. A 4:00 pm time slot associated with the excluded "Sportscenter" cell has been omitted from the list 668 of time slots 530 in FIG. 10. This loose time axis 585 may support individual condensing of cells along a time axis.

Media content processing subsystem 110 may be configured to provide at least one tool configured to enable a user to toggle between different program guide views, including unfiltered program guide views and filtered and condensed program guide views. For example, media content processing subsystem 110 may be configured to toggle between the program guide view in FIG. 6 and the condensed program guide view in FIG. 8 when a user presses a certain button on input device 113. Accordingly, a user can conveniently switch between a condensed program guide view and an uncondensed program guide view with the press of a button. Other inputs may be used for toggling in other embodiments.

Figure 11:
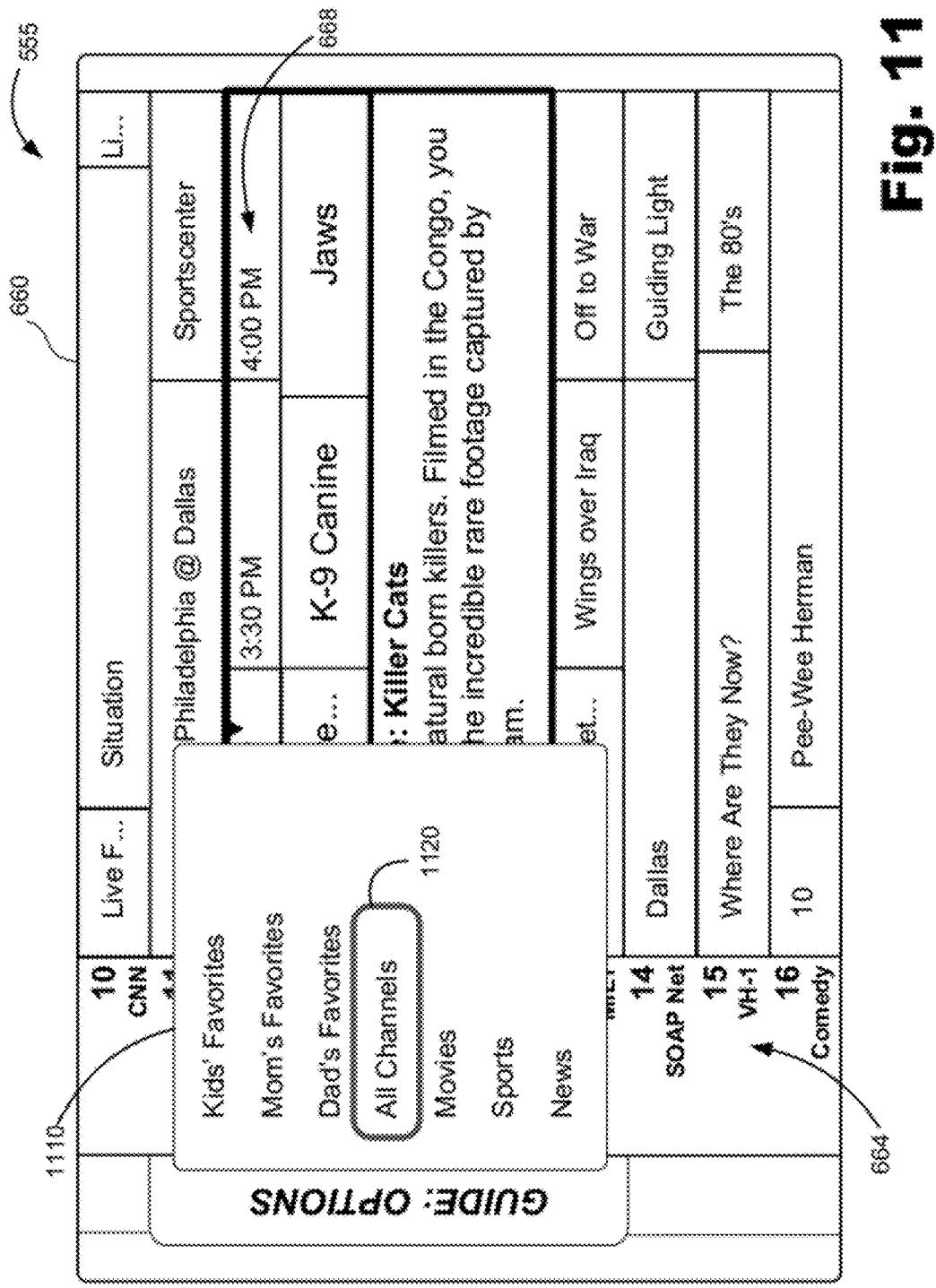
FIG. 11 illustrates another program guide filter tool displayed in the viewing area of FIG. 6.

As another example, media content processing subsystem 110 may be configured to provide a pop-up graphical user interface including selectable options respectively associated with various program guide views. For example, when the program guide view of FIG. 6 is displayed, a user may provide input (e.g., by pressing a button on the user input device 113), and media content processing subsystem 110 may, in response to the input, provide pop-up window 1110 for display in program guide GUI 660, as shown in FIG. 11. In the illustrated example, pop-up window 1110 includes another program guide filter tool having a list of selectable options, each of which may be associated with a program guide view. For instance, an "All Channels" option may be associated with an uncondensed program guide view, a "Movies" option may be associated with a condensed program guide view including cells associated with movie content, a "Sports" option may be associated with another condensed program guide view including cells associated with sports content, and a "News" option may be associated with another condensed program guide view including cells associated with news media content. Accordingly, a user may switch between various unfiltered, uncondensed program guide views and various filtered, condensed program guide views. In certain embodiments, this may be accomplished by a user moving a selector object 1120 from option to option and selecting a highlighted option.

As shown in FIG. 11, pop-up window 1110 may further include options associated with user profile views. For instance, a "Dad's Favorites" option may be associated with a filtered, condensed program guide view displaying cells associated with media content instances and/or content channels 520 that have been identified and associated with a particular user profile titled "Dad." When this option is selected, a corresponding condensed program guide view including pre-identified media content instances (e.g., favorite programs) and/or content channels 520 (e.g., favorite channels) may be displayed. A "Mom's Favorites" option may be associated with another filtered, condensed program guide including media content instances and/or content channels 520 associated with another user profile titled "Mom." A "Kids' Favorites" option may be associated with another filtered, condensed program guide including media content instances and/or content channels 520 associated with one or more other user profiles.

Accordingly, parameters for filtering a program guide to generate a filtered, condensed program guide may be based on user profiles, including media content instances and/or content channels 520 that have been associated with the user profiles. A filtered, condensed program guide may include media content instances and/or content channels 520 associated with a single user profile or a combination of multiple user profiles. Accordingly, media content instances and/or content channels 520 associated with multiple user profiles may be combined into a condensed program guide view. Information included in the condensed program guide view may be identified by user profile. For instance, various colors may be used to respectively identify information by user profile. Other distinguishing features may be used in other embodiments.

As mentioned above, the exemplary interstitial symbols described herein are illustrative only. Any suitable graphics may be used in a condensed program guide to represent one or more cells that have been excluded from condensed program guides.

Figure 12:
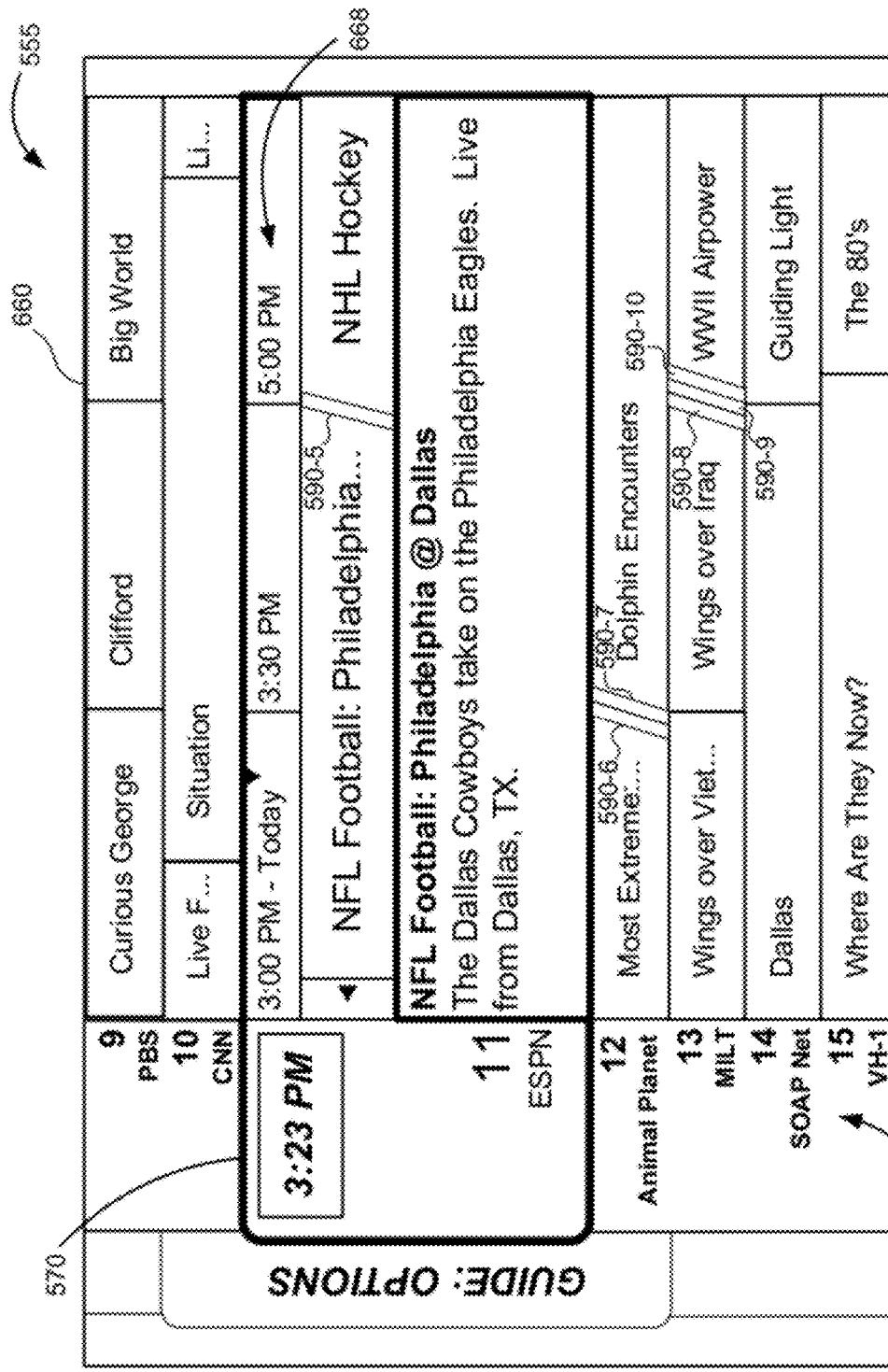
FIG. 12 illustrates yet another exemplary condensed program guide view displayed in the viewing area of FIG. 6.

Interstitial symbols may be configured to provide information about excluded cells. For example, interstitial symbols may visually indicate spatial positions of excluded cells, as described above. As another example, interstitial symbols may be configured to visually indicate the number of cells that have been excluded. To illustrate, FIG. 12 illustrates an exemplary condensed program guide view as may be presented in program guide GUI 660. As shown in FIG. 12, the program guide view includes interstitial symbols 590-5 through 590-10 representing cells that have been filtered and excluded from the program guide view. Interstitial symbol 590-5 may be configured to represent a single excluded cell. Interstitial symbols 590-6 and 590-7 may be configured to respectively represent two cells that have been excluded from the program guide view. Interstitial symbols 590-8, 590-9, and 590-10 may be configured to respectively represent three cells that have been excluded from the program guide view.

When adjacent cells are removed from a program guide to generate a filtered, condensed program guide, in certain embodiments interstitial symbols 590 may be arranged to indicate that adjacent cells have been excluded. For example, interstitial symbols 590-6 and 590-7 may be stacked as shown in FIG. 12 to indicate that two adjacent cells have been excluded from the program guide view. Similarly, interstitial symbols 590-8, 590-9, and 590-10 may be stacked as shown in FIG. 12 to indicate that three adjacent cells have been excluded from the program guide view. Stacked interstitial symbols 590 may include distinguishing attributes such as distinct colors or shading. In the example illustrated in FIG. 12, the stacked interstitial symbols 590 comprise slanted (e.g., diagonal) bars positioned adjacent to one another.

The stacking of interstitial symbols 590 to represent multiple adjacent cells that have been excluded is illustrative only. Other visual indications may be used in other embodiments. For example, an interstitial symbol may display a number or other symbol indicative of a number of adjacent cells that have been excluded. As another example, an interstitial symbol may display an ellipses indicating that multiple adjacent cells have been excluded.

Figure 13:
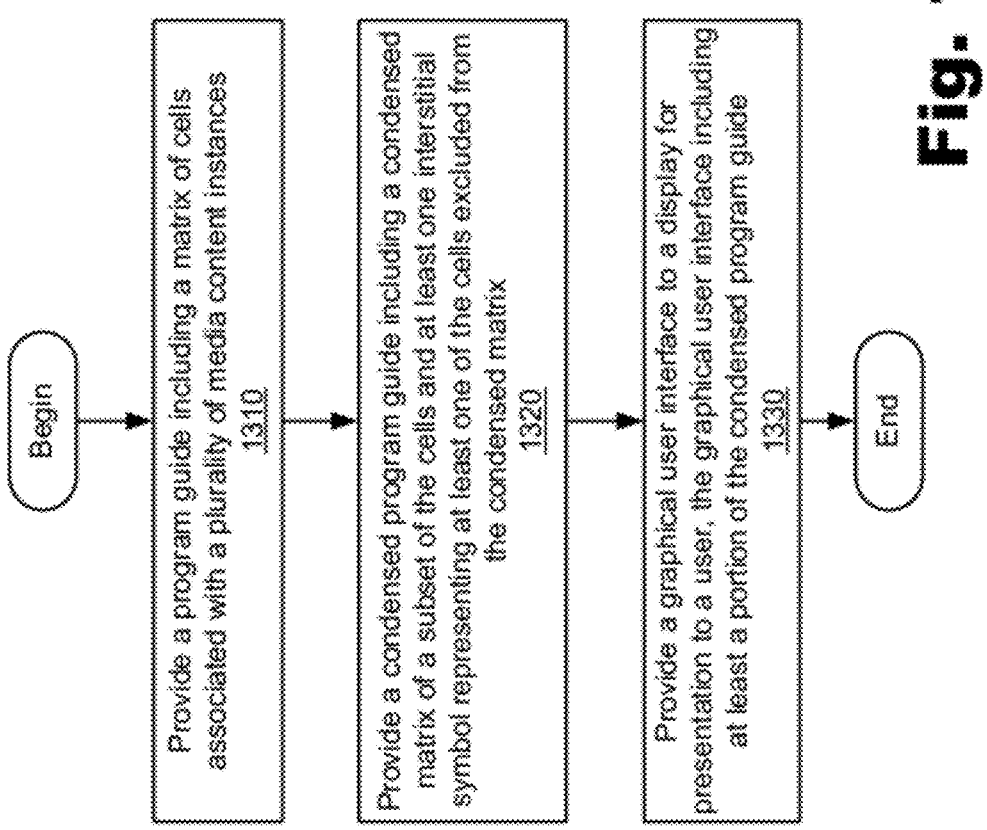
FIG. 13 illustrates an exemplary method of providing a condensed program guide.

FIG. 13 illustrates an exemplary method of providing a condensed program guide. While FIG. 13 illustrates exemplary steps according to one embodiment, other embodiments may omit, add to, reorder, and/or modify any of the steps shown in FIG. 13.

In step 1310, a program guide is provided. The program guide includes a matrix of cells associated with a plurality of media content instances. Step 1310 may be performed in any of the ways described above, including media content processing subsystem 110 generating and providing the program guide based on program guide data.

In step 1320, a condensed program guide is provided. The condensed program guide includes a condensed matrix of a subset of the cells in the program guide and at least one interstitial symbol representing at least one of the cells excluded from the condensed matrix. Step 1320 may be performed in any of the ways described above, including media content processing subsystem 110 filtering the program guide, condensing the subset of cells in the filtered program guide, and inserting the interstitial symbol. In certain embodiments, step 1320 may be performed in accordance with steps 1420-1460 of FIG. 14, which steps are described below.

In step 1330, a graphical user interface is provided to a display for presentation to a user. The graphical user interface includes at least a portion of the condensed program guide. Step 1330 may be performed in any of the ways described above, including media content processing subsystem 110 providing data representative of the graphical user interface to display 112.

Figure 14:
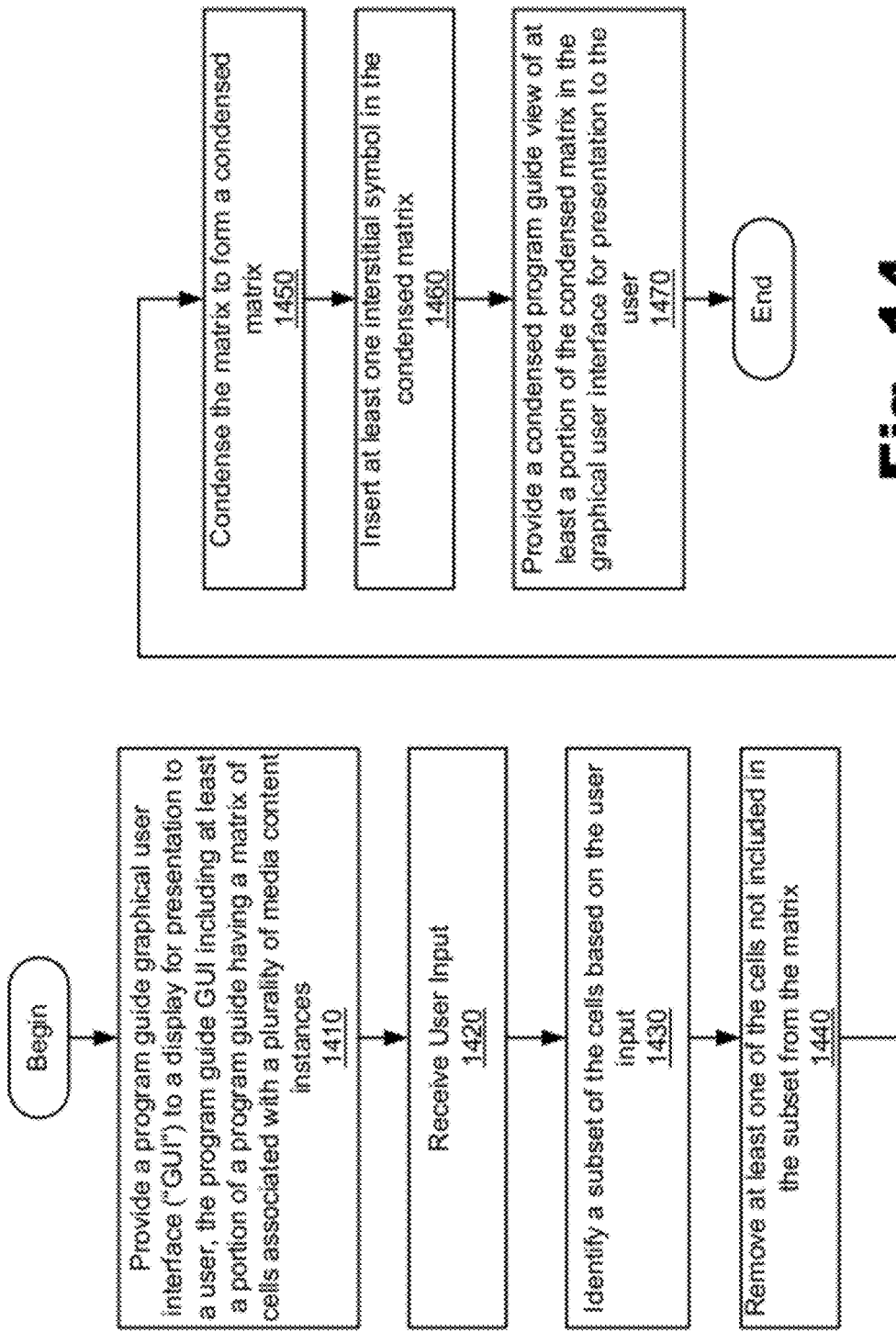
FIG. 14 illustrates another exemplary method of providing a condensed program guide.

FIG. 14 illustrates another exemplary method of providing a condensed program guide. While FIG. 14 illustrates exemplary steps according to one embodiment, other embodiments may omit, add to, reorder, and/or modify any of the steps shown in FIG. 14.

In step 1410, a program guide GUI is provided to a display for presentation to a user. The program guide GUI includes at least a portion of a program guide having a matrix of cells associated with a plurality of media content instances. Step 1410 may be performed in any of the ways described above, including media content processing subsystem 110 providing data representative of the program guide GUI to display 112.

In step 1420, user input is received. Step 1420 may be performed in any of the ways described above, including media content processing subsystem 110 receiving data representative of user input from input device 113.

In step 1430, a subset of the cells in the matrix is identified based on the user input. Step 1430 may be performed in any of the ways described above, including media content processing subsystem 110 comparing the user input to metadata associated with the media content instances associated with the cells.

In step 1440, at least one of the cells not included in the identified subset of cells is removed from the matrix. Step 1440 may be performed in any of the ways described above, including media content processing subsystem 110 removing the excluded cells from the program guide matrix.

In step 1450, the matrix is condensed to form a condensed matrix. Step 1450 may be performed in any of the ways described above, including media content processing subsystem 110 repositioning cells included in the identified subset to fill in gaps left by the removed cells in accordance with a predefined condensing heuristic.

In step 1460, at least one interstitial symbol is inserted in the condensed matrix. Step 1460 may be performed in any of the ways described above, including media content processing subsystem 110 inserting the interstitial symbol at a position to indicate a matrix position of a removed cell.

In step 1470, a condensed program guide view of at least a portion of the condensed matrix is provided in the program guide GUI for presentation to the user. Step 1470 may be performed in any of the ways described above, including media content processing subsystem 110 providing data representative of the program guide GUI including the condensed matrix to display 112.

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. The above description and accompanying drawings are accordingly to be regarded in an illustrative rather than a restrictive sense.

What is claimed is:

1. A method comprising:
    providing, by a computing device, a program guide that includes a matrix of cells associated with a plurality of media content instances, the matrix of cells arranged along a time axis; and
    providing, by the computing device, a condensed program guide that includes a condensed matrix of a subset of the cells and a plurality of interstitial symbols, the condensed matrix of the subset of the cells and the plurality of interstitial symbols arranged along a loose time axis, each cell that is included in the matrix of the cells and that is excluded from the condensed matrix of the subset of the cells, wherein the plurality of interstitial symbols do not occupy matrix grid space in the condensed matrix.

2. The method of claim 1, wherein each interstitial symbol in the plurality of interstitial symbols indicates a matrix position of a single cell represented by the interstitial symbol.

3. The method of claim 1, wherein each interstitial symbol in the plurality of interstitial symbols comprises a spatially insubstantial indicator of a matrix position of a single cell represented by the interstitial symbol.

4. The method of claim 1, further comprising:
providing, by the computing device, a first program guide view of the program guide for display; and
providing, by the computing device, a second program guide view of the condensed program guide for display.

5. The method of claim 4, further comprising:
receiving, by the computing device, user input; and
toggling, by the computing device in response to the user input, between providing the first program guide view and the second program guide view.

6. The method of claim 1, further comprising:
receiving, by the computing device, user input;
identifying, by the computing device, the subset of the cells based on the user input;
removing, by the computing device, each of the cells not included in the identified subset of the cells from the matrix of cells;
spatially condensing, by the computing device, the subset of the cells to form the condensed matrix; and
inserting, by the computing device, the plurality of interstitial symbols in the condensed matrix.

7. The method of claim 1, further comprising:
removing, by the computing device from the matrix of cells, each of the cells excluded from the subset of the cells; and
repositioning, by the computing device, at least one cell included in the subset of the cells along the loose time axis to fill in at least one gap in the matrix of the cells created by the removing.

8. The method of claim 1, wherein the loose time axis accommodates unaligned time slots within the condensed program guide.

9. The method of claim 1, wherein the condensed matrix includes a column of cells within the subset of the cells, the column of cells associated with different time slots.

10. The method of claim 1, further comprising:
detecting, by the computing device, a user selection of an interstitial symbol included in the plurality of interstitial symbols included in the condensed program guide; and
removing, by the computing device in response to the user selection, the selected interstitial symbol from the condensed matrix; and
adding, by the computing device to the condensed matrix in response to the user selection, a single cell corresponding to the selected interstitial symbol to the condensed program guide.

11. The method of claim 1, tangibly embodied as computer-executable instructions on at least one non-transitory computer-readable medium.

12. A system comprising:
at least one processor; and
a program guide facility that directs the at least one processor to
provide a program guide that includes a matrix of cells associated with a plurality of media content instances, the matrix of cells arranged along a time axis, and
provide a condensed program guide that includes a condensed matrix of a subset of the cells and a plurality of interstitial symbols, the condensed matrix of the subset of the cells and the plurality of interstitial symbols arranged along a loose time axis, each cell that is included in the matrix of the cells and that is excluded from the condensed matrix of the subset of the cells,
wherein the plurality of interstitial symbols do not occupy matrix grid space in the condensed matrix.

13. The system of claim 12, wherein each interstitial symbol in the plurality of interstitial symbols comprises a spatially insubstantial indicator of a matrix position of a single cell represented by the interstitial symbol.

14. The system of claim 12, wherein:
the loose time axis accommodates unaligned time slots within the condensed two-dimensional program guide.

15. The method of claim 1, wherein each interstitial symbol in the plurality of interstitial symbols is integrated with the cells included in the condensed matrix.

16. The method of claim 1, wherein each interstitial symbol in the plurality of interstitial symbols is positioned between boundary edges of cells included in the condensed matrix.

\* \* \* \* \*